(12) United States Patent
Yu et al.

(10) Patent No.: US 10,372,397 B2
(45) Date of Patent: Aug. 6, 2019

(54) MULTIMEDIA OUTPUT AND DISPLAY DEVICE SELECTION

(71) Applicant: InFocus Corporation, Portland, OR (US)

(72) Inventors: Raymond Yu, Fremont, CA (US); John Lee, Los Altos Hills, CA (US)

(73) Assignee: INFOCUS CORPORATION, Portland, OR (US)

( * ) Notice: Subject to any disclaimer, the term of this patent is extended or adjusted under 35 U.S.C. 154(b) by 390 days.

(21) Appl. No.: 14/928,887

(22) Filed: Oct. 30, 2015

(65) Prior Publication Data

US 2016/0054971 A1 Feb. 25, 2016

Related U.S. Application Data

(63) Continuation-in-part of application No. 13/838,707, filed on Mar. 15, 2013, now Pat. No. 9,210,376.

(51) Int. Cl.
| | |
|---|---|
| *G05B 11/01* | (2006.01) |
| *G06F 3/14* | (2006.01) |
| *G06F 3/0346* | (2013.01) |
| *G08C 17/02* | (2006.01) |
| *H04N 7/15* | (2006.01) |

(52) U.S. Cl.
CPC .......... *G06F 3/1423* (2013.01); *G06F 3/0346* (2013.01); *G08C 17/02* (2013.01); *H04N 7/15* (2013.01)

(58) Field of Classification Search
CPC .............................. G08C 17/02; H04L 12/281
USPC ........................................ 340/12.52; 704/275
See application file for complete search history.

(56) References Cited

U.S. PATENT DOCUMENTS

| | | | |
|---|---|---|---|
| 5,109,222 | A | 4/1992 | Welty |
| 5,485,149 | A | 1/1996 | Takiguchi et al. |
| 5,646,608 | A | 7/1997 | Shintani |
| 5,832,296 | A | 11/1998 | Wang et al. |
| 5,956,025 | A | 9/1999 | Goulden et al. |
| 6,255,961 | B1 | 7/2001 | Van Ryzin et al. |
| 6,292,283 | B1 | 9/2001 | Grandbois |
| 6,407,779 | B1 | 6/2002 | Herz |
| 6,717,528 | B1 | 4/2004 | Burleson et al. |
| 6,793,352 | B2 | 9/2004 | Karasawa et al. |
| 6,822,602 | B2 | 11/2004 | Kang et al. |
| 7,224,903 | B2 | 5/2007 | Colmenarez et al. |
| 7,310,770 | B2 | 12/2007 | Humpleman et al. |

(Continued)

FOREIGN PATENT DOCUMENTS

WO 2012091191 A1 7/2012

OTHER PUBLICATIONS

ISA Korean Intellectual Property Office, International Search Report and Written Opinion Issued in Application No. PCT/US2014/024784, dated Jul. 16, 2014, WIPO, 13 pages.

*Primary Examiner* — Abdul-Samad A Adediran
(74) *Attorney, Agent, or Firm* — McCoy Russell LLP

(57) ABSTRACT

Systems and methods for configuring, identifying, and selecting a desired display device of one or more display devices for multimedia output are provided. In one embodiment, a spatial orientation, display device identifier, and one or more connectivity identifiers are associated with each of one or more display devices. The associated data for each of the one or more display devices is stored in as configuration data in a configuration database for subsequent use in selecting a desired display device.

20 Claims, 22 Drawing Sheets

(56) References Cited

U.S. PATENT DOCUMENTS

| | | | |
|---|---|---|---|
| 7,689,095 B2 | 3/2010 | Sugiyama et al. | |
| 7,862,179 B2 | 1/2011 | Shan et al. | |
| 8,014,763 B2 | 9/2011 | Hymes | |
| 8,086,704 B2 | 12/2011 | Honma | |
| 8,244,233 B2 | 8/2012 | Chang et al. | |
| 8,244,462 B1 | 8/2012 | Zhu | |
| 8,267,526 B2 | 9/2012 | Jung et al. | |
| 8,320,612 B2 | 11/2012 | Knobel et al. | |
| 8,320,824 B2 | 11/2012 | Banks et al. | |
| 8,704,867 B2 | 4/2014 | Hubenthal et al. | |
| 2003/0073430 A1 | 4/2003 | Robertson et al. | |
| 2007/0040900 A1 | 2/2007 | Castles | |
| 2008/0266380 A1 | 10/2008 | Gorzynski et al. | |
| 2009/0287928 A1 | 11/2009 | Braun | |
| 2010/0083333 A1 | 4/2010 | Mizosoe et al. | |
| 2011/0126116 A1 | 5/2011 | Lee et al. | |
| 2011/0138327 A1 | 6/2011 | Scott et al. | |
| 2011/0164065 A1 | 7/2011 | Mate et al. | |
| 2012/0169482 A1* | 7/2012 | Chen | G08C 17/02 340/12.52 |
| 2012/0254220 A1 | 10/2012 | Verthein et al. | |
| 2012/0257115 A1 | 10/2012 | Slobodin et al. | |
| 2012/0260295 A1 | 10/2012 | Rondeau | |
| 2012/0291075 A1 | 11/2012 | Pan | |
| 2014/0156281 A1* | 6/2014 | Boyd | H04L 12/281 704/275 |

* cited by examiner

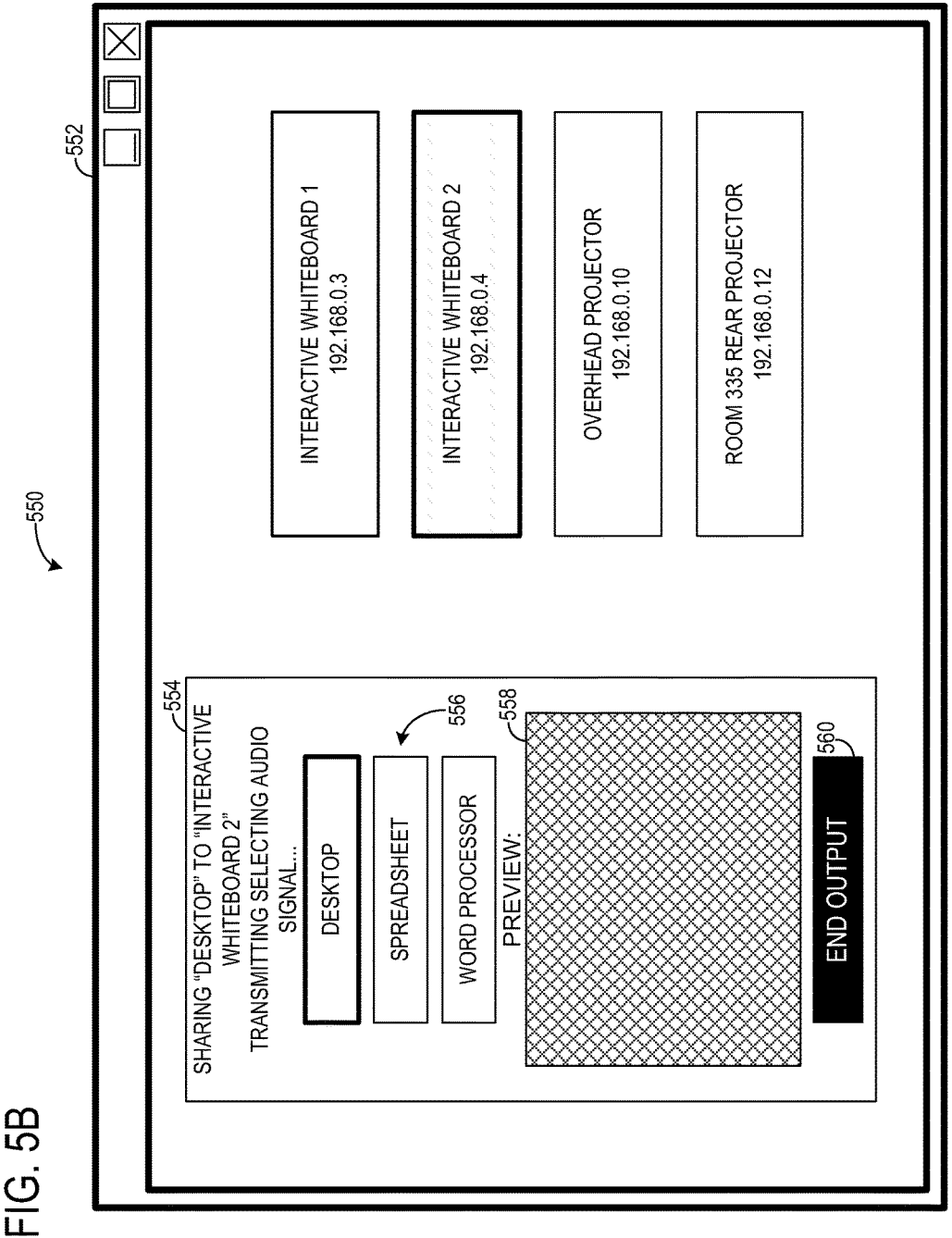

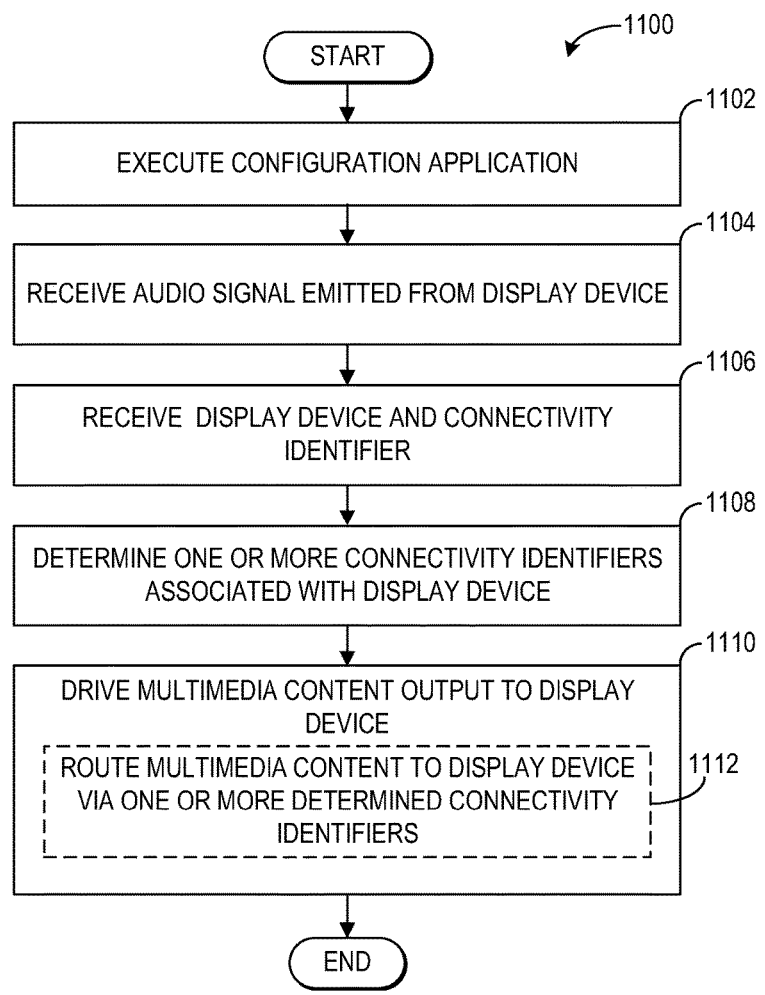

MULTIMEDIA OUTPUT AND DISPLAY DEVICE SELECTION

CROSS REFERENCE TO RELATED APPLICATIONS

The present application is a continuation-in-part of U.S. patent application Ser. No. 13/838,707, entitled "MULTIMEDIA OUTPUT AND DISPLAY DEVICE SELECTION," filed on Mar. 15, 2013, the entire contents of which are hereby incorporated by reference for all purposes.

BACKGROUND AND SUMMARY

The creation and consumption of multimedia content (e.g., photographs, music, video, etc.) is increasingly expanding and diversifying, as are the devices used to carry out such actions. In multimedia environments, for example in the home, professional, and other environments, users can expect to encounter a plurality of electronic devices used to develop and process multimedia content. As such, both the configuration and use of such devices in an environment may be time-consuming, cumbersome, and unintuitive. Device-specific means (e.g., a device-specific remote) may be required to address each device, for example. Additionally, users often must spend a considerable amount of time configuring display devices in a conference room for a multimedia presentation so that a source device supplying multimedia content can correctly address a desired display device among a plurality of display devices. This connectivity difficulty becomes even more difficult in settings where there is more than one display device. A user may be forced to manually enter the information to link to a specific display device and such manual entry may be time consuming and cumbersome due to differences in the device-specific configurations.

To address at least some of the above issues, the inventors herein provide systems and methods for environment configuration, and identifying and selecting a desired display device out of one or more display devices for multimedia output. In one embodiment, a respective identifying spatial orientation and one or more connectivity identifiers are associated with each of one or more display devices. A respective selecting spatial orientation is then received. The respective selecting spatial orientation is matched to the respective identifying spatial orientation to thereby determine the desired display device from the one or more display devices. Multimedia content is then routed from a source device to the desired display device via one of the one or more associated connectivity identifiers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 5B shows an exemplary control application having a graphical user interface in accordance with an embodiment of the present disclosure.

FIG. 11 shows an example method for configuring a source device to identify and select one or more display devices for multimedia content output in accordance with an embodiment of the present disclosure.

DETAILED DESCRIPTION

The present disclosure will now be described more fully hereinafter with reference to the accompanying drawings, in which exemplary embodiments of the invention are shown. The particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the systems or methods are described as an order of individual steps or using specific devices, it is appreciated that steps or devices may be interchangeable such that the description of the invention may include multiple steps or devices arranged in many ways.

The present disclosure provides systems and methods for configuring, identifying and selecting a desired display device of one or more display devices for multimedia output. In one embodiment, a respective identifying spatial orientation and one or more connectivity identifiers are associated with each of one or more display devices. A respective selecting spatial orientation is then received. The respective selecting spatial orientation is matched to the respective identifying spatial orientation to thereby determine the desired display device from the one or more display devices. Multimedia content is then routed from a source device to the desired display device via one of the one or more associated connectivity identifiers.

Figure 1A:
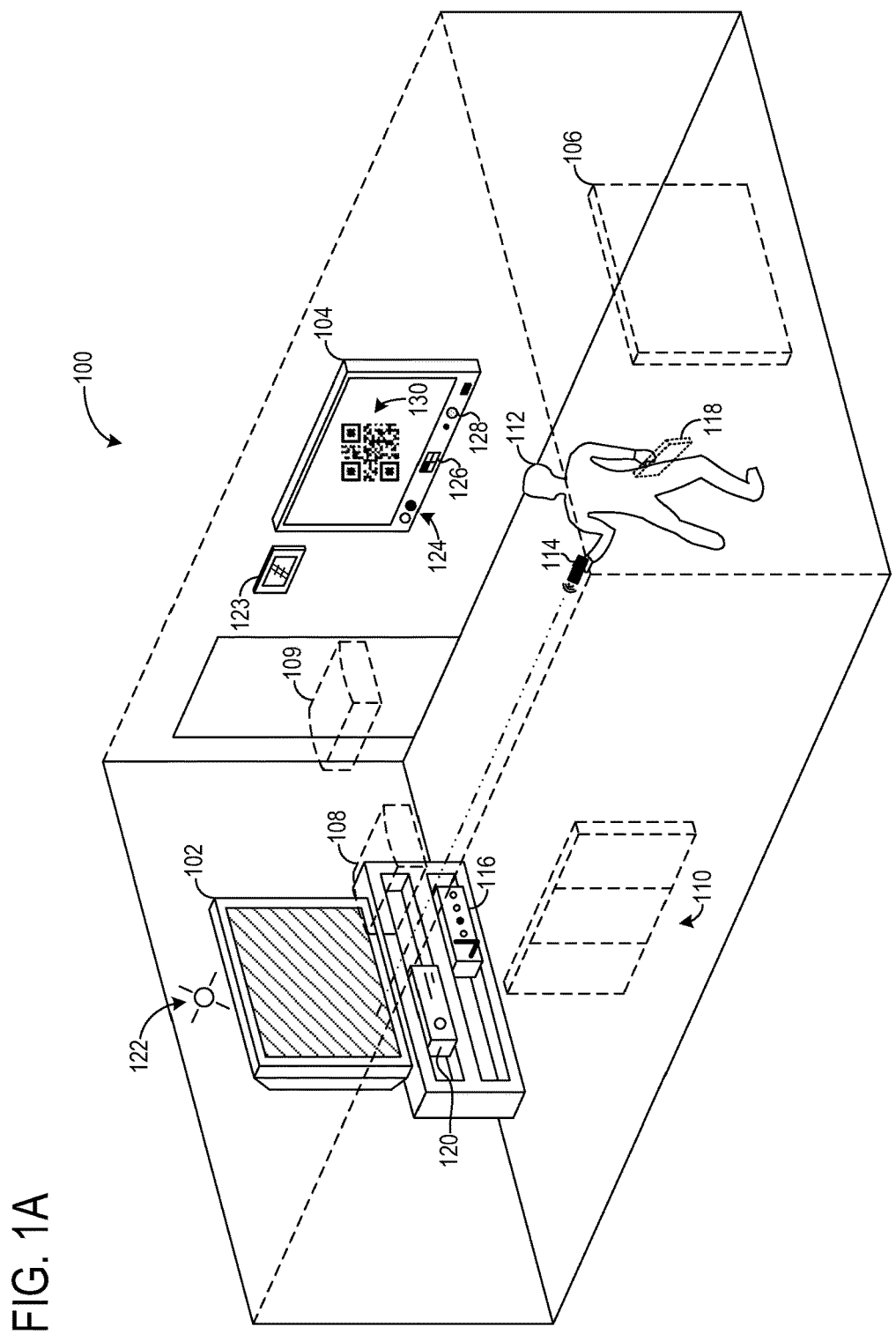
FIG. 1A shows an embodiment of a multimedia environment in accordance with an embodiment of the present disclosure.
Figure 1B:
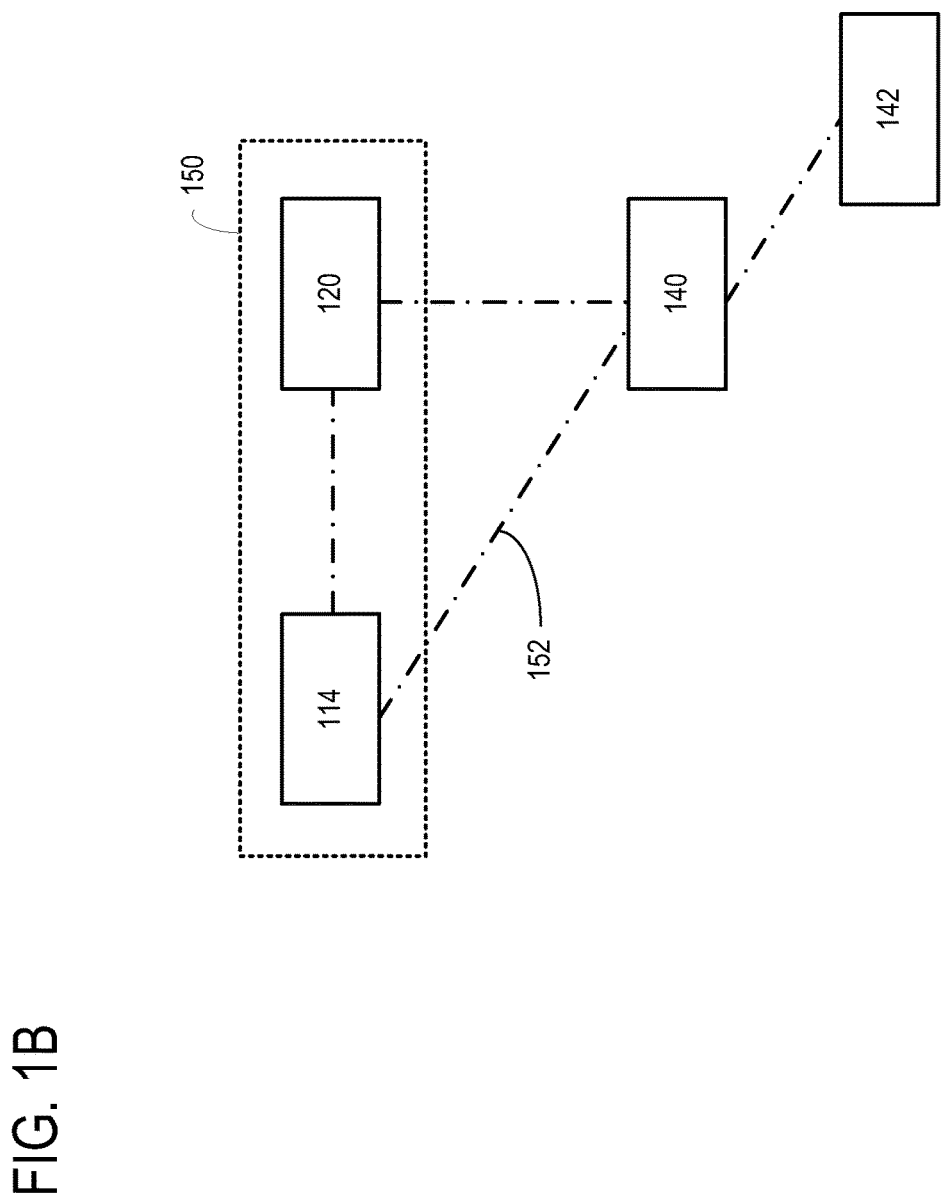
FIG. 1B shows an example schematic diagram of network connections between devices during configuration.
Figure 2:
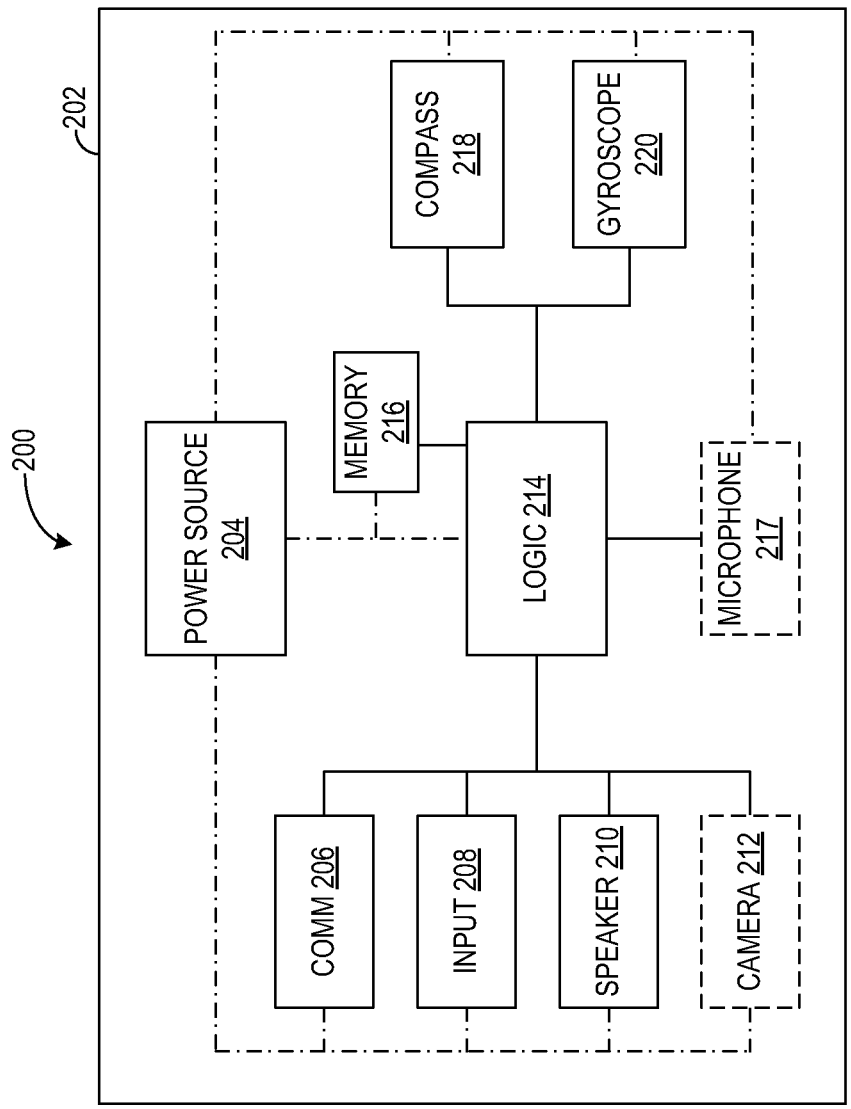
FIG. 2 shows a schematic diagram of a selection device in accordance with an embodiment of the present disclosure.
Figure 3B:
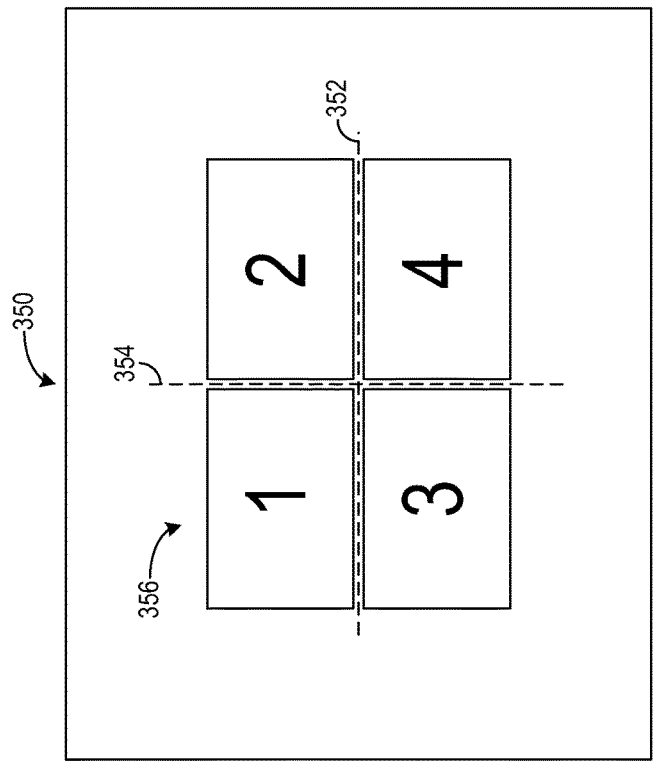
FIG. 3B shows a partial view of yet another multimedia environment in accordance with an embodiment of the present disclosure.
Figure 3A:
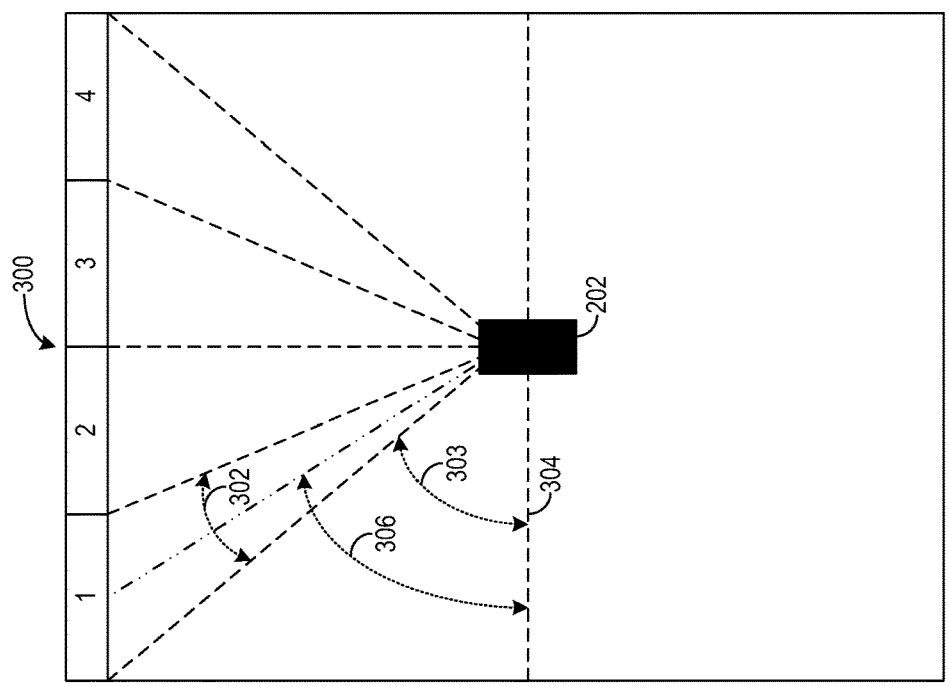
FIG. 3A shows a plan view of another multimedia environment in accordance with an embodiment of the present disclosure.
Figure 3C:
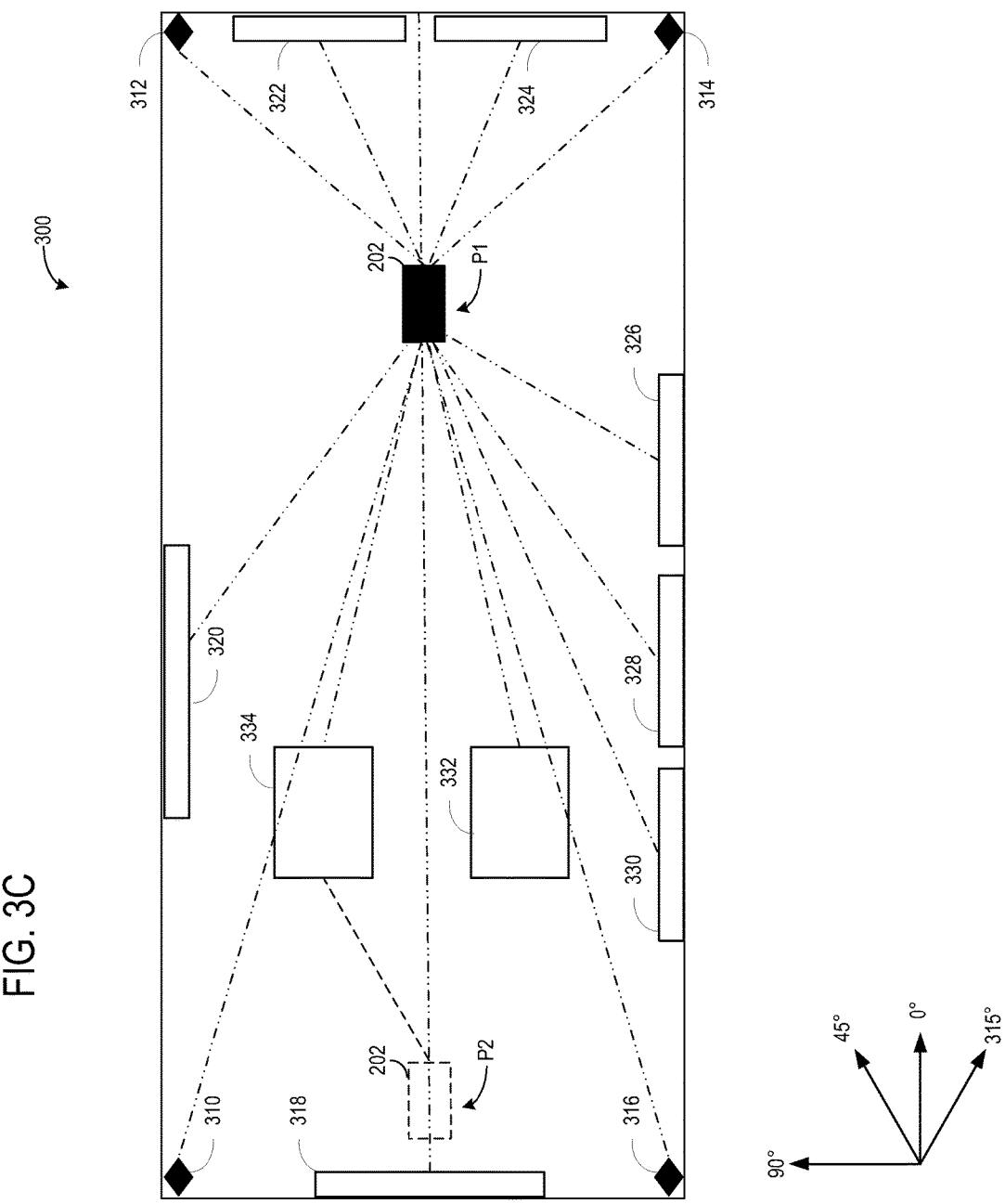
FIGS. 3C and 3D show a plan view and a partial view of yet another multimedia environment in accordance with an embodiment of the present disclosure.
Figure 3D:
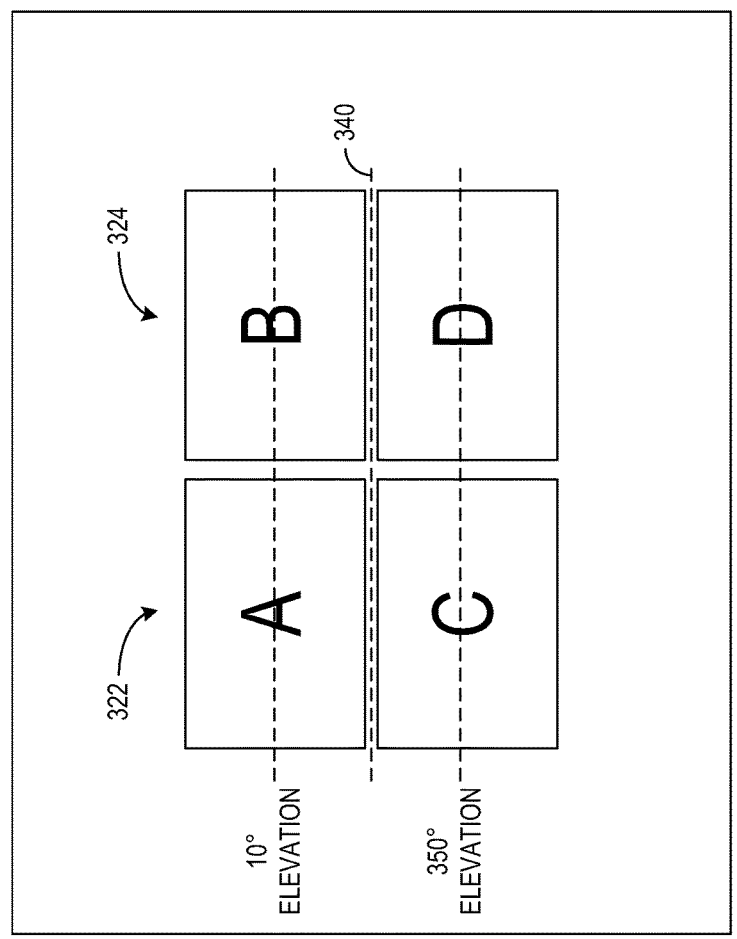
Figure 3E:
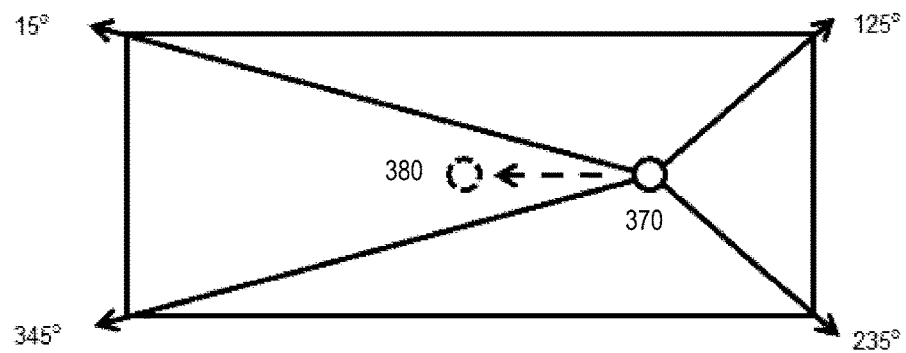
FIG. 3E show a schematic for mapping display devices by measuring reference sources in a multimedia environment in accordance with an embodiment of the present disclosure.
Figure 3F:
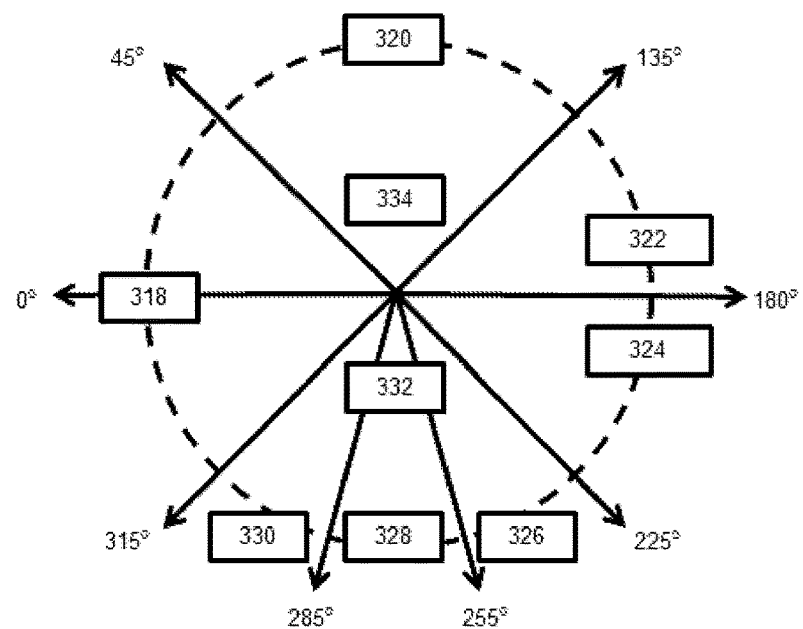
FIGS. 3F and 3G show a schematic map for display devices in a multimedia environment.
Figure 3G:
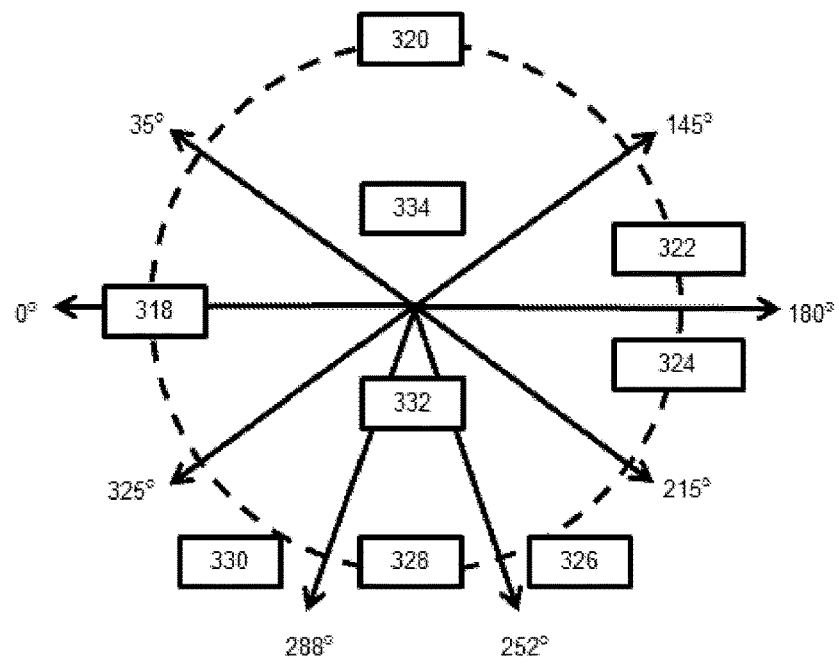
Figure 4A:
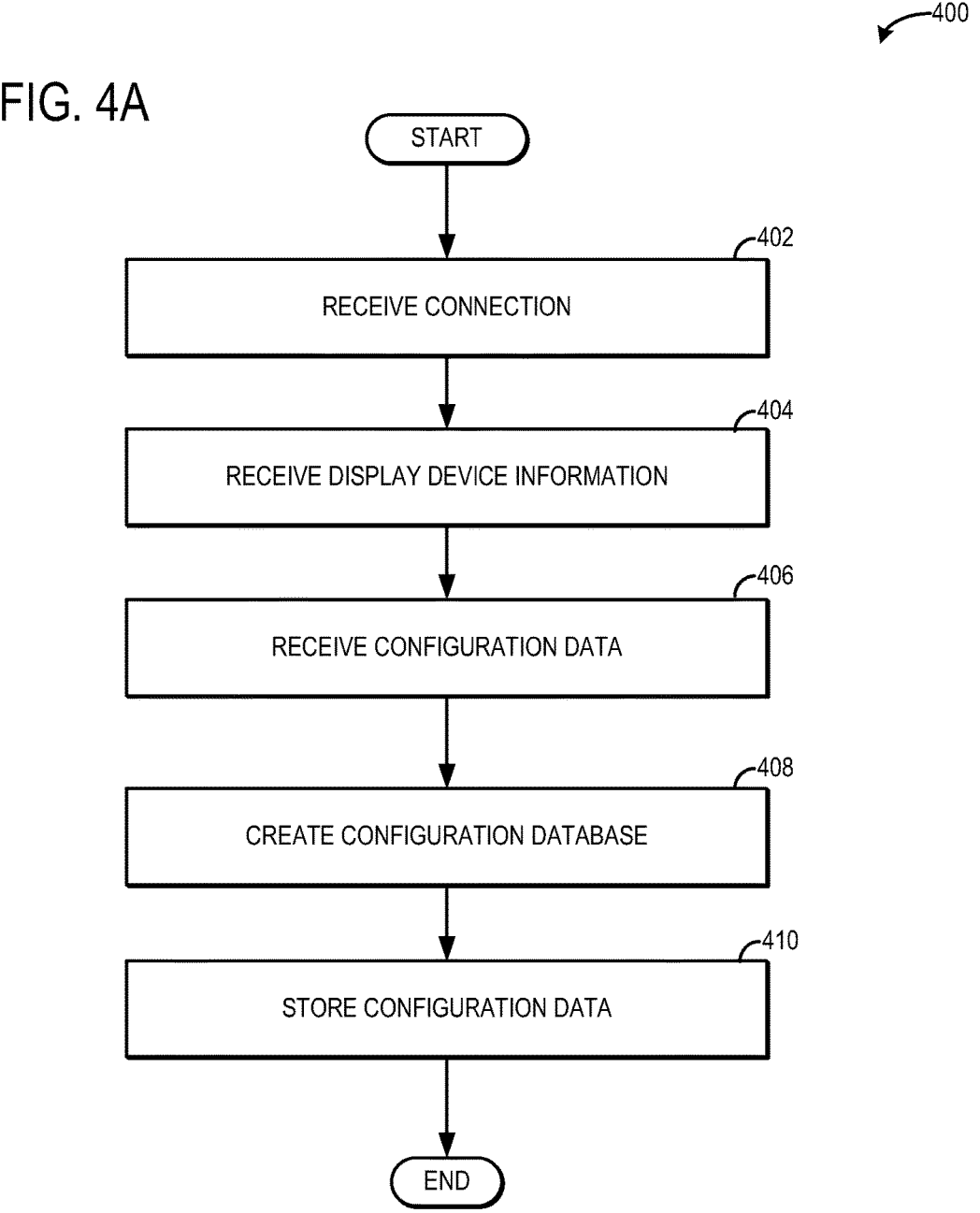
FIG. 4A shows an example method for environment configuration of a multimedia environment.
Figure 4B:
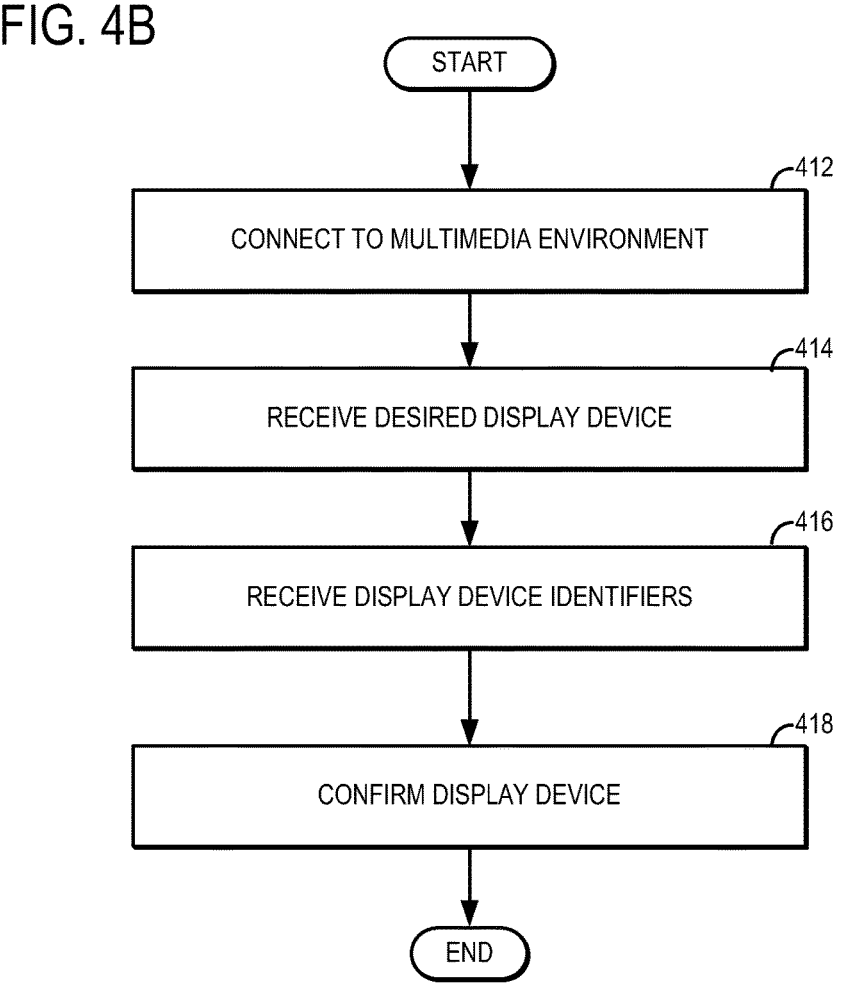
FIG. 4B shows an example method for selection in a multimedia environment.
Figure 4C:
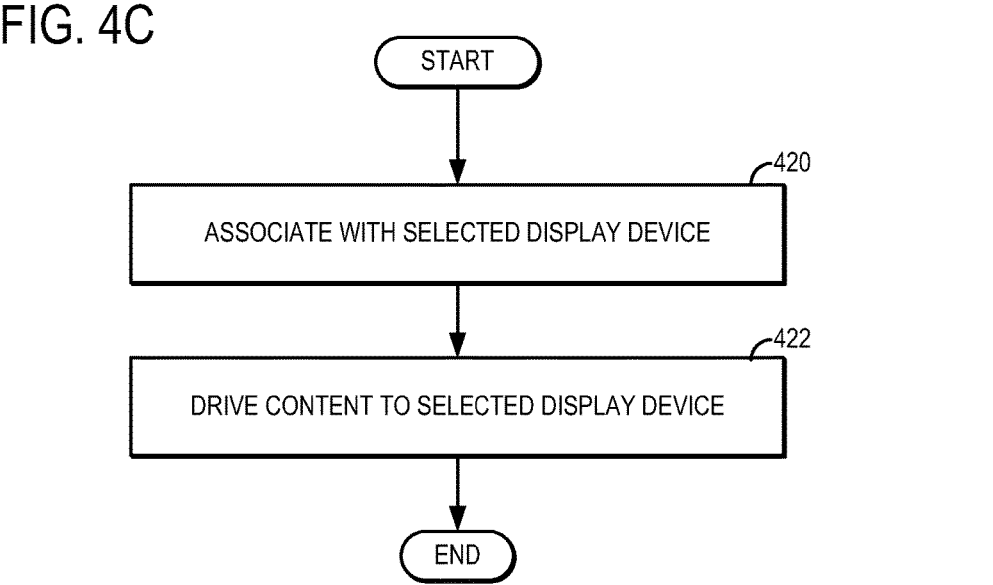
FIG. 4C shows an example method for displaying in a multimedia environment.
Figure 4D:
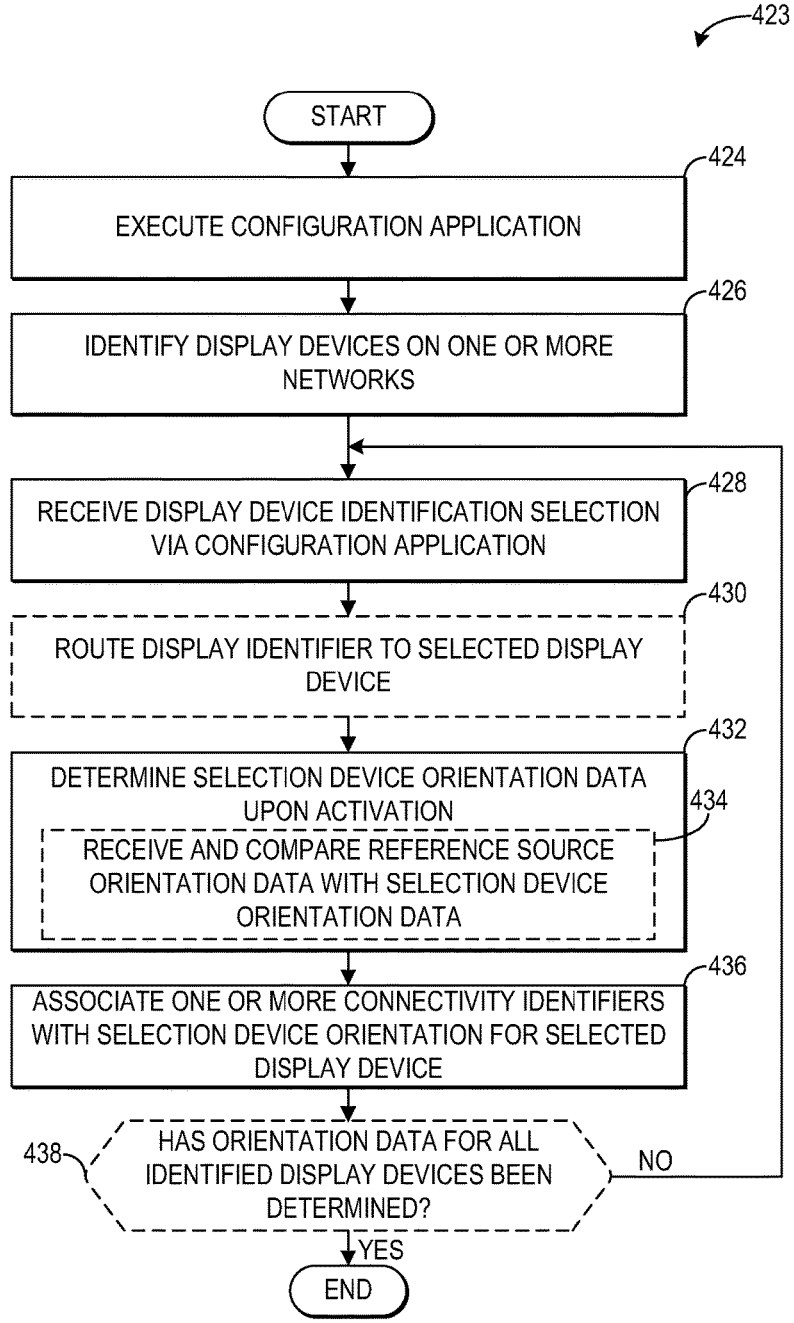
FIG. 4D shows an example method for configuring a device to identify and select one or more display devices for multimedia content output in accordance with an embodiment of the present disclosure.
Figure 4E:
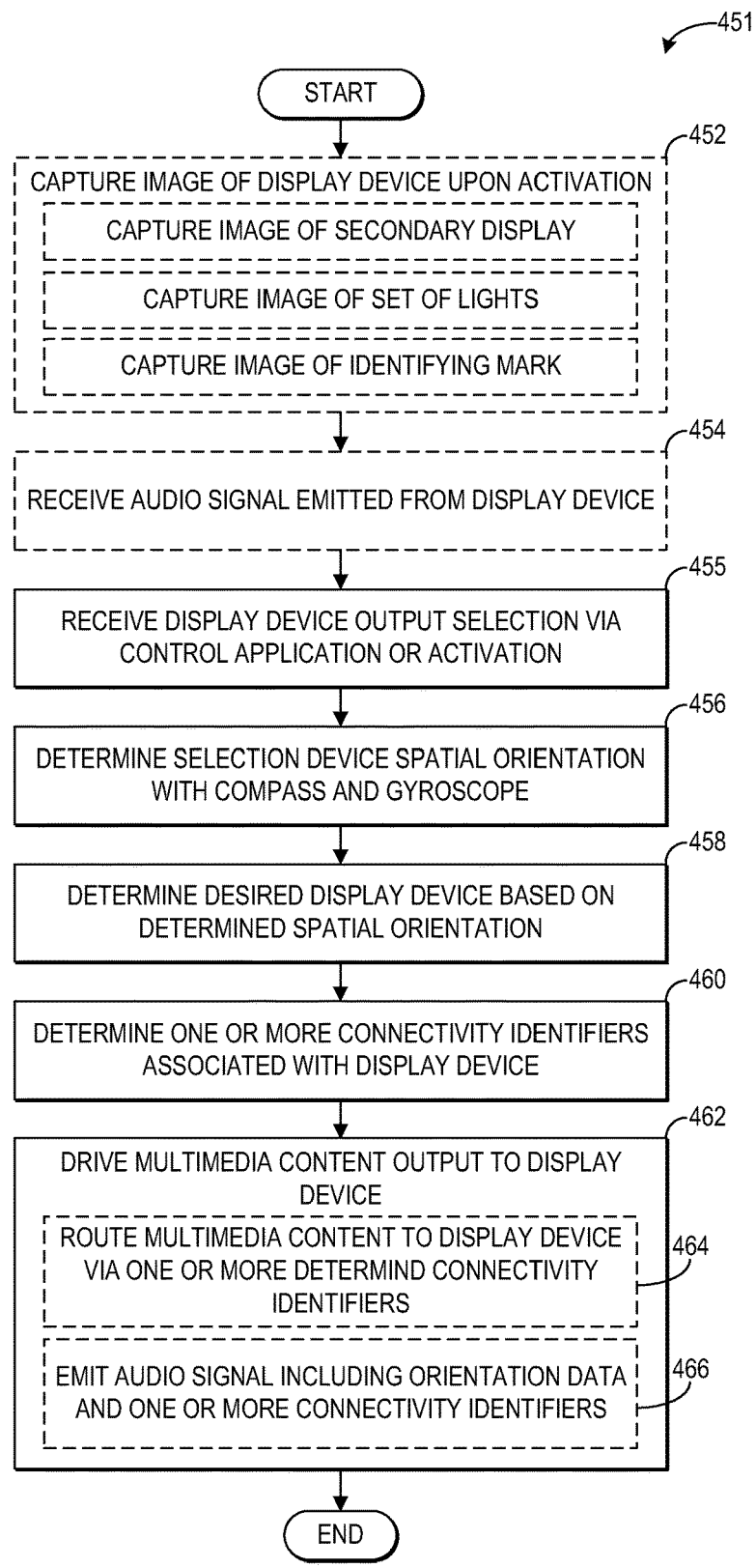
FIG. 4E shows an example method for selecting display devices for multimedia content output in accordance with an embodiment of the present disclosure.
Figure 5A:
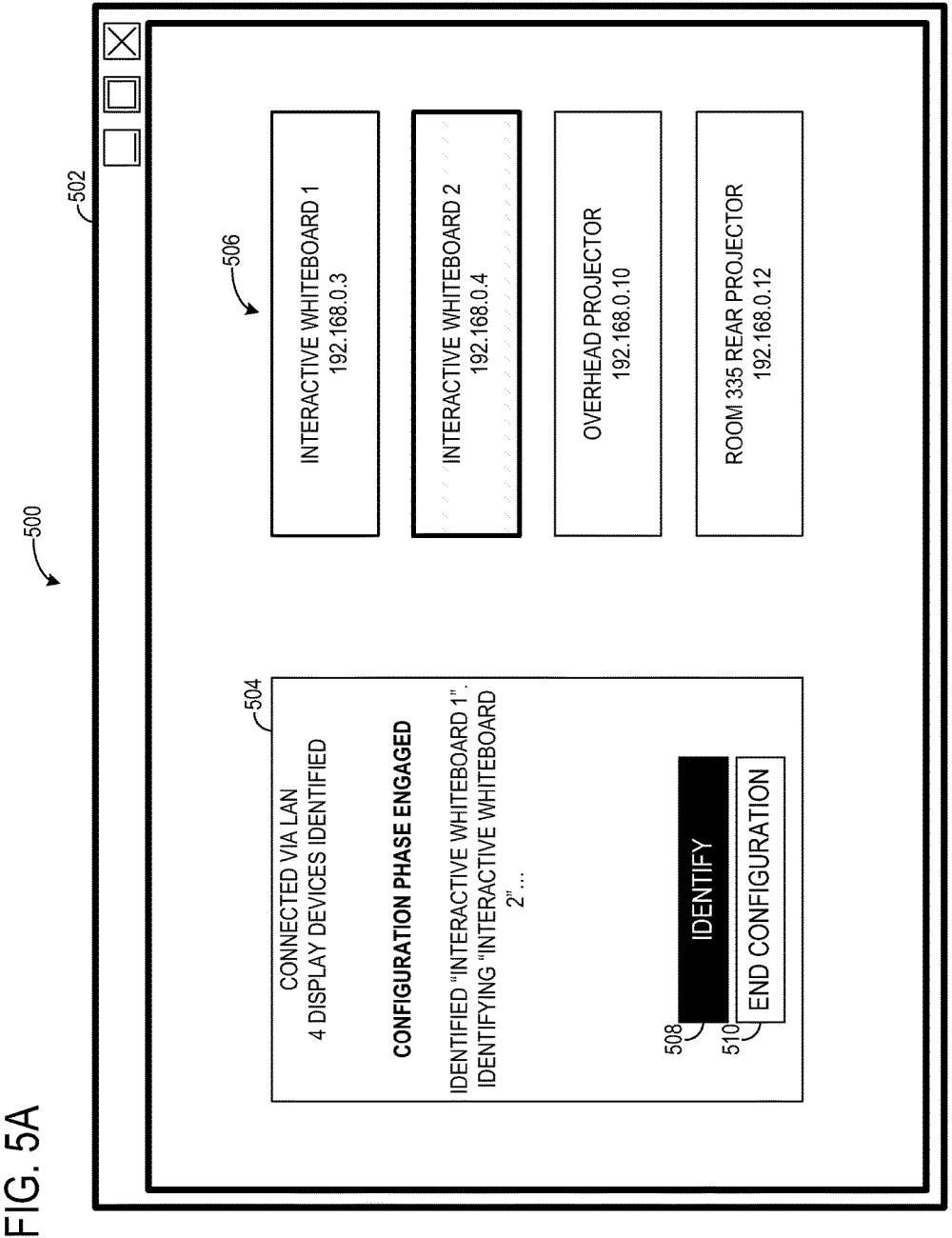
FIG. 5A shows an exemplary configuration application having a graphical user interface in accordance with an embodiment of the present disclosure.
Figure 6:
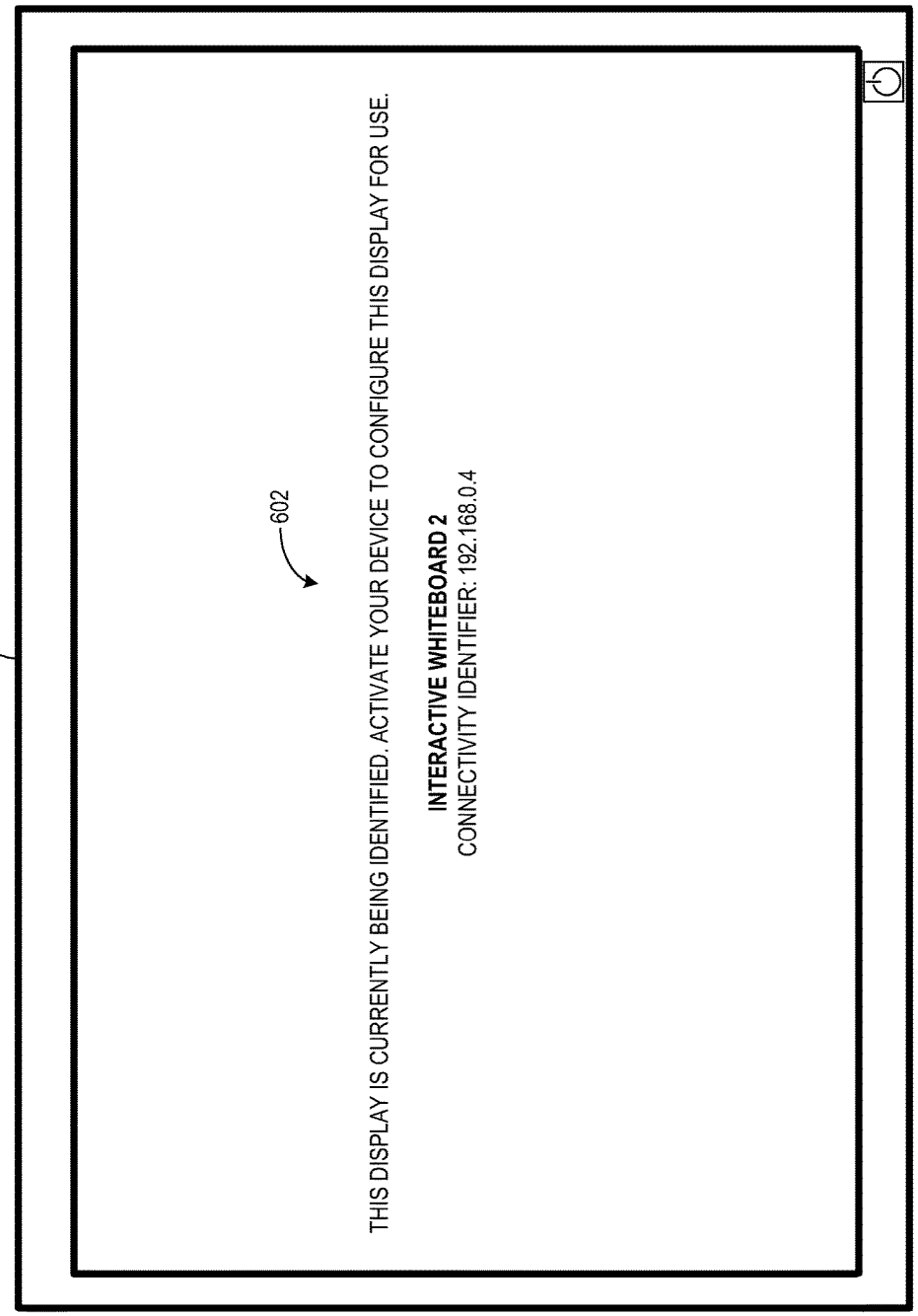
FIG. 6 shows an exemplary display identifier in accordance with an embodiment of the present disclosure.
Figure 7:
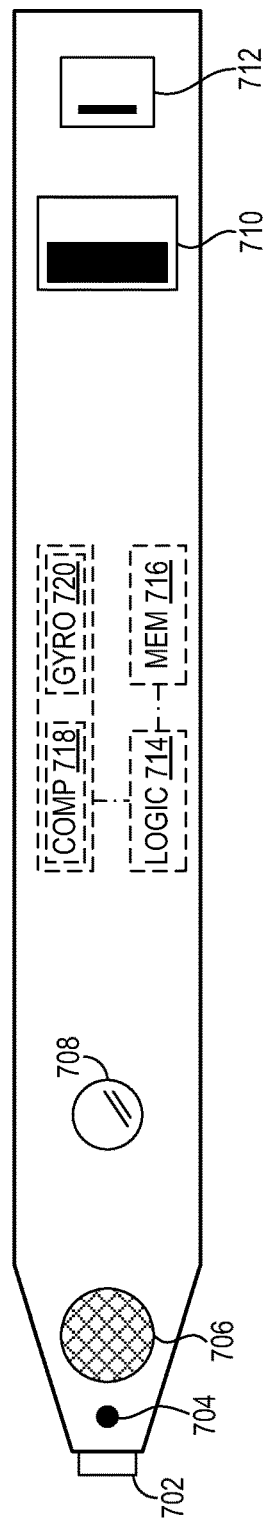
FIG. 7 shows an exemplary pointing device in accordance with an embodiment of the present disclosure.
Figure 8:
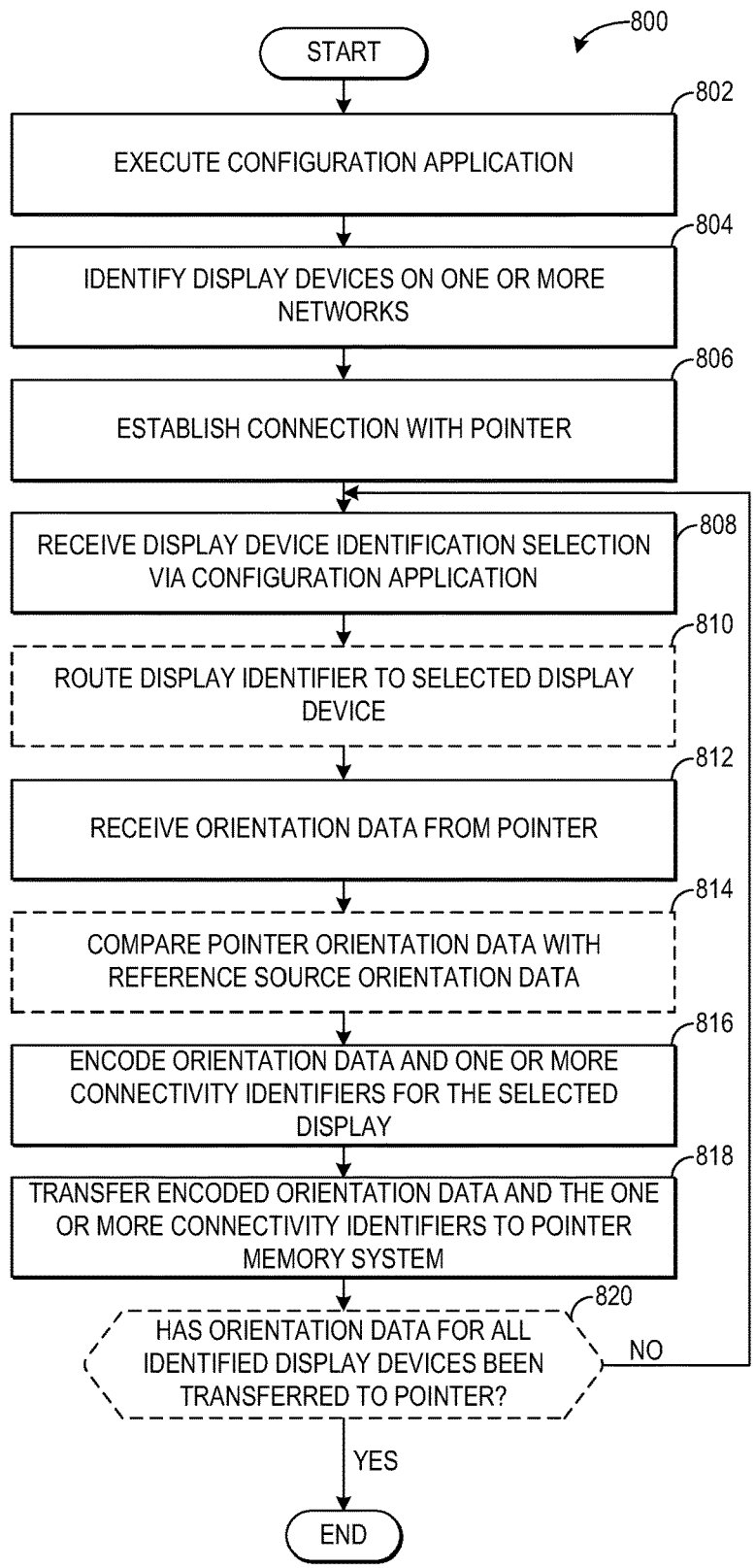
FIG. 8 shows an example method for configuring the pointing device of FIG. 7 to identify one or more display devices in accordance with an embodiment of the present disclosure.
Figure 9:
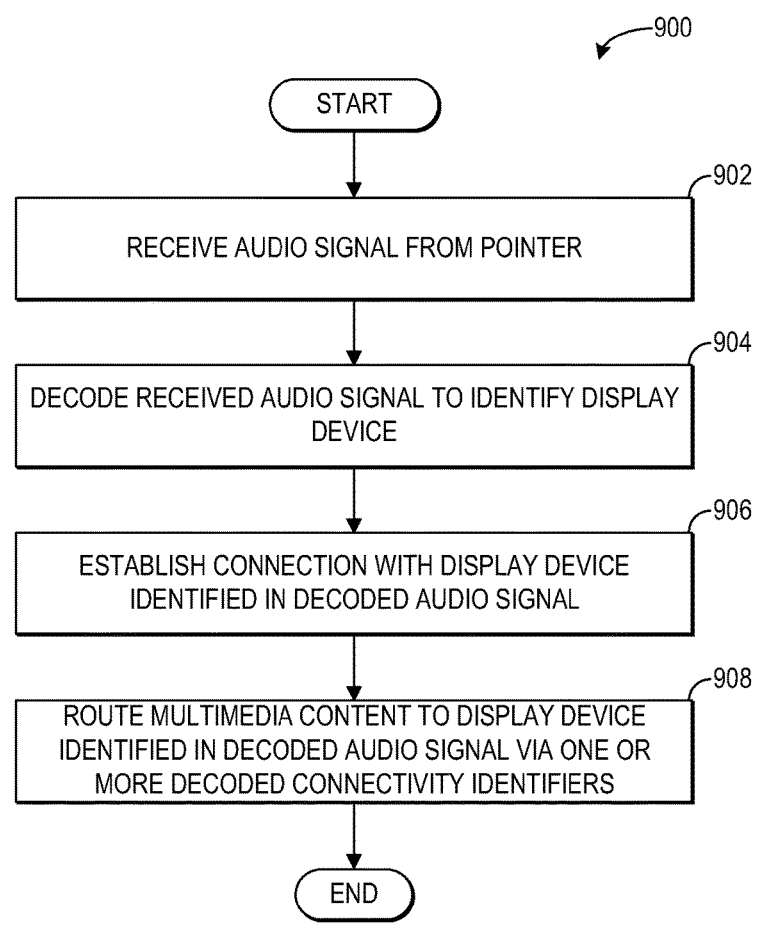
FIG. 9 shows an example method for selecting display devices for multimedia content output with the pointing device of FIG. 7 in accordance with an embodiment of the present disclosure.
Figure 10A:
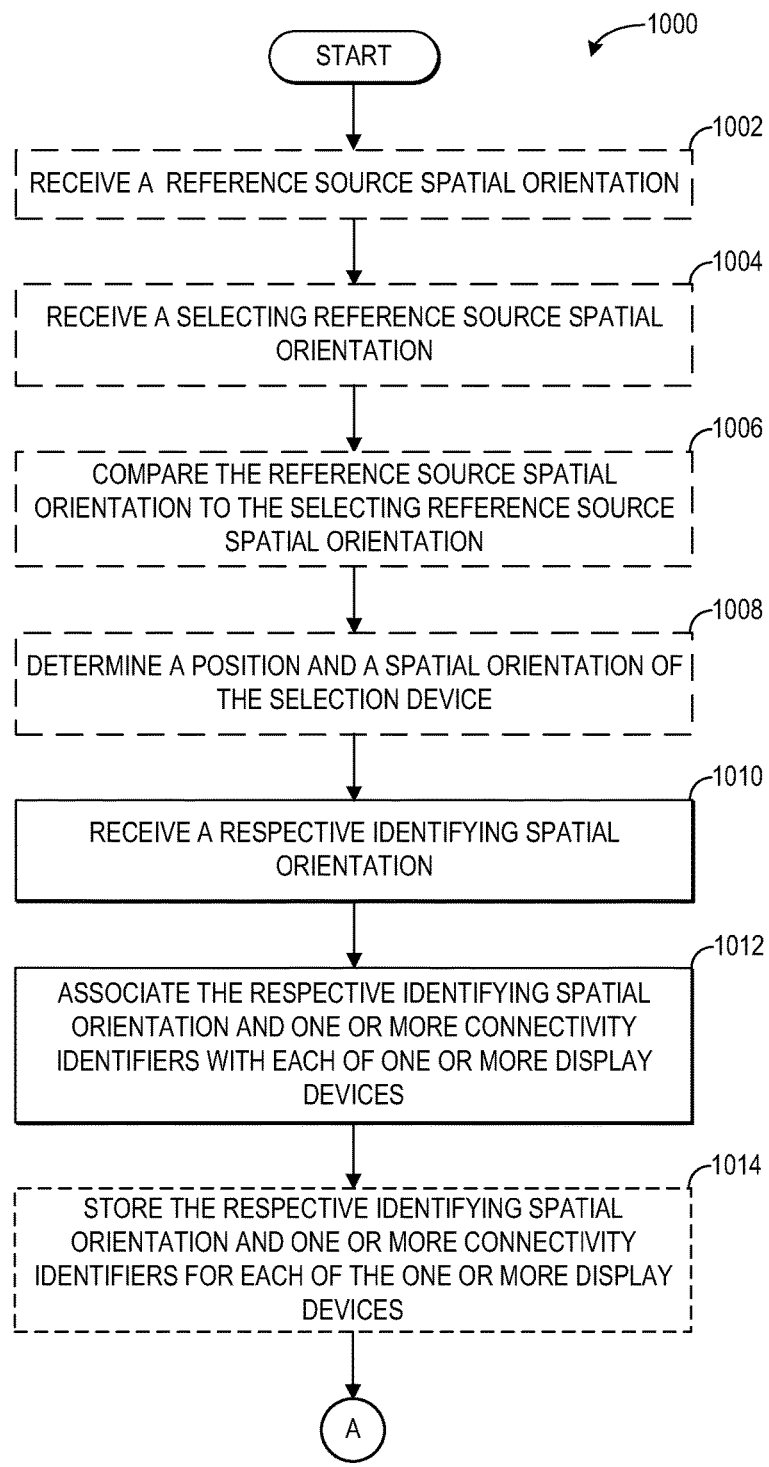
FIGS. 10A and 10B shows an example method for routing multimedia content to a desired display device which may be implemented in the environment of FIG. 1A according to an embodiment of the present disclosure.
Figure 10B:
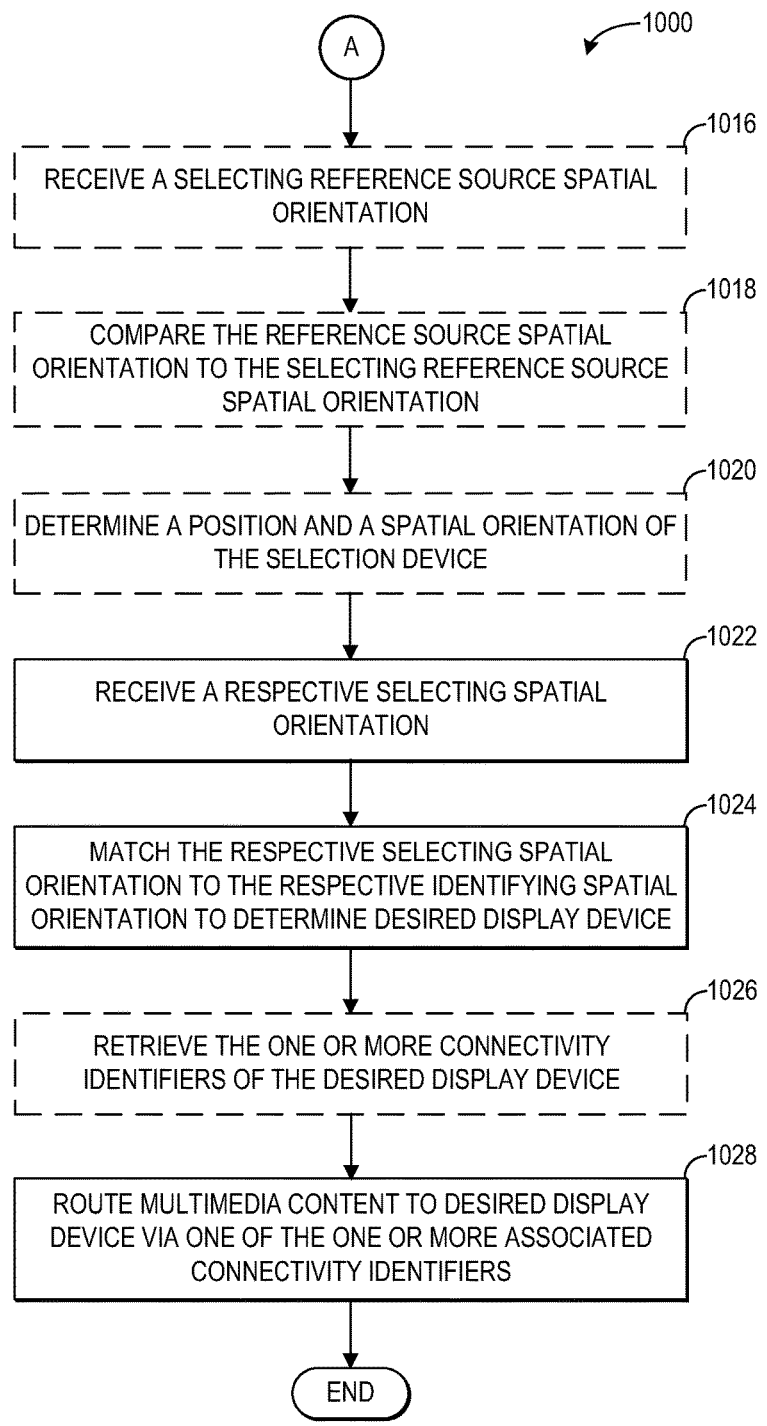

FIG. 1A shows an embodiment of a multimedia environment in accordance with an embodiment of the present disclosure. FIG. 1B shows an example schematic diagram of possible network connections between devices in a multimedia environment. FIG. 2 shows a schematic diagram of a selection device which may be used to identify and/or select display devices in the environment of FIG. 1A. FIG. 3A shows a plan view of another multimedia environment, while FIG. 3B shows a partial view of yet another multimedia environment. FIGS. 3C and 3D show a plan view and partial view of yet another multimedia environment. FIG. 3E shows a schematic for mapping display devices by measuring reference points in a multimedia environment in accordance with an embodiment of the present disclosure. FIGS. 3F and 3G show schematic maps for display devices relative to a selection device in a multimedia environment. FIGS. 4A, 4B and 4C show example methods for environment configuration, selection, and displaying in a multimedia environment. FIG. 4D shows a method for configuring device to identify and select one or more display devices for multimedia content, while FIG. 4E shows a method for selecting display devices for multimedia content output. FIG. 5A shows an exemplary configuration application having a graphical user interface, and FIG. 5B shows an exemplary control application also having a graphical user interface. FIG. 6 shows an exemplary display identifier which may be used to identify a display device undergoing identification. FIG. 7 shows an exemplary pointing device also referred to as a selection device which may implement the elements shown in FIG. 2. FIG. 8 shows a method for configuring the pointing device of FIG. 7 to identify one or more display devices. FIG. 9 shows a method for selecting display devices for multimedia content output with the pointing device of FIG. 7. FIGS. 10A and 10B show a method for routing multimedia content to a desired display device which may be implemented in the environment of FIG. 3C. FIG. 11 shows a method for configuring a source device to identify and select one or more display devices for multimedia content output which may be implemented in the environment of FIG. 3C.

FIG. 1A schematically shows an embodiment of a multimedia environment, environment 100 in accordance with the present disclosure. Environment 100 includes a plurality of display devices, also referred to herein as displays, which may receive and output multimedia content. Examples of displays, include but are not limited to, display device 102, which may be a cathode-ray tube (CRT) television, display device 104, which may be a wall-mounted liquid crystal display (LCD) monitor, display device 106, which may be an organic light-emitting diode (OLED) display, display device 108, which may be a video projector mounted to a leftward portion of a ceiling of environment 100, display device 109, which may be a video projector mounted to a rightward portion of the ceiling of environment 100, and display array 110, which in this example comprises three individual plasma display devices mounted side-by-side in a horizontally-packed configuration. It will be appreciated that the number and types of display devices described above are provided as non-limiting examples and other examples are considered, including, but not limited to digital white boards, large format displays, front projection devices, rear projection devices, etc. Such number and type may be varied without departing from the scope of this disclosure, and the display devices in environment 100 may be of any suitable type of display configured to output multimedia content.

"Multimedia content" as used herein primarily refers to content including visual elements—e.g., images, video, animation, etc. In some embodiments, however, multimedia content may include other forms of content, such as audio. It will be assumed that the display devices in environment 100 include display screens or other output elements by which they may output visual multimedia content, though such display devices may include other components configured to output other forms of multimedia content, such as speakers configured to output audio.

Environment 100 may represent a number of environments in accordance with the present disclosure. In one scenario, environment 100 may represent a home multimedia environment in which a user 112 selectively directs multimedia content output to one or more desired display devices, for example by directing multimedia content output to display device 102 to watch a movie or television show. Environment 100 may also represent a conference room environment in which individual control of each display device and their respective output is desired. In this example, user 112, who may be among a plurality of users in environment 100, has entered the environment with a selection device 114. Selection device 114 may be controlled by user 112 to select a desired display device for multimedia content output. Selection device 114 may be, for example, a smartphone, tablet computer, personal data assistant, hand-held gaming console, etc. In some examples, the selection device may be brought into the environment or room by the user or, alternatively, the selection device may be available for use by the user in the environment.

Multimedia content to be shared may reside on what is referred to herein as a "source device" (e.g., source device 118). A source device may be the device from which multimedia content to be shared originates. Shown in this example, as a laptop computer, source device 118 may be any suitable device configured to store and output multimedia content, including a cellular phone, smartphone, desktop computer, laptop computer, home-theater personal computer, gaming console, tablet computer, etc. In this example, source device 118 may be referred to as an "external" source device, and may be operatively connected to selection device 114. Selection device 114 may then be used to select a desired display device for multimedia content output and communicate information regarding the selection to source device 118 to cause the multimedia content to be routed to the selected display device. Such information may be conveyed, for example, via emission of audio signals from selection device 114 to source device 118. It will be appreciated, however, that a selection device and a source device may be integrated into a single device without departing from the scope of this disclosure. In such embodiments, a single device may be used to select display devices while storing multimedia content. Should the selection and source device be integrated into a single device, the source device may be referred to as an "integral" source device.

As noted above, source device may be any suitable computing device configured to store and/or output multimedia content. In some examples, the source device may be brought into the environment or room by the user or, alternatively, the source device may be available for use by the user in the environment. As a non-limiting example, the source device 118 may be brought into the room with user 112. The individual may set the source device on a conference table or other surface and access their source device in the usual manner. In other examples, a locally-residing networked computer or other device in the environment may function as the source device. It will be appreciated that in some examples, desired output data may be retained on a memory device and used in a source device.

Selection device 114 and/or source device 118 may interface with one or more networks to which the display and other devices in environment 100 may be commonly or individually connected, for example via an Ethernet port and/or wireless transceiver. In one embodiment, environment 100 includes a network device 116, which may be a router, hub, switch, or other device configured to link a plurality of devices together over a telecommunications network.

Network device 116 may or may not be located in environment 100 but nevertheless operatively coupled to the other devices in the environment. Network device 116 may be connected to the Internet via an internet service provider, and supply such Internet connection to the devices to which it is connected. In such a case, network device 116 may thus provide a cloud network to source device 118 and display devices 102, 104, 106, 108, 109, and 110. Alternatively or additionally, network device 116 may connect such devices over a local area network (LAN) or a wireless local area network (WLAN). Moreover, one or more of display devices 102, 104, 106, 108, 109, and 110, and source device 118 may include components configured to establish a two-way communication link among themselves, for example a Wi-Fi or Bluetooth-compliant transceiver. Still further, one or more of display devices 102, 104, 106, 108, 109, and 110, and source device 118 may include a transceiver enabling Digital European Cordless Telecommunications (DECT) communication. As display devices 102, 104, 106, 108, 109, and 110 may be connected to one or more of the networks described above, they each may be assigned a connectivity identifier to thereby identify each device on the network(s). If, for example, the display devices are commonly connected to a LAN provided by network device 116, each display may be assigned a specific internet protocol (IP) address. In this way, content originating on source device 118 may be easily and selectively routed, shared, and outputted to one or more display devices in environment 100 via the connectivity identifiers described above.

Multimedia content, originating in this example on source device 118, may be shared in some embodiments to a desired display device by controlling the spatial orientation and activation of selection device 114. "Activation" or "activating," as used herein, refers to a change in state of selection device 114. In the embodiment in which selection device 114 is a smartphone, for example, user 112 may press a button on a touch screen, thereby activating selection device 114 and driving multimedia content output from source device 118 to a desired display device selected based on the spatial orientation of the source device. As described in further detail below with reference to FIG. 2, a user may use the selection device to choose a display. In some examples, the spatial orientation of selection device 114 may be determined by an orientation component including a compass and gyroscope. For example, the compass may determine the direction of north, at which point the orientation of the gyroscope may be recorded. As selection device 114 is subsequently manipulated, the gyroscope orientation may be compared to its previously-recorded orientation corresponding to north to thereby determine the orientation and/or pointing direction of selection device 114, for example in a 360° angular range.

In the example shown in FIG. 1A, user 112 desires to share and output multimedia content originating on source device 118 to display device 102. Accordingly, user 112 has gripped and pointed selection device 114 toward display device 102, the pointing represented in the figure by the dotted axis extending from the selection device. Upon user activation, selection device 114 may record and match its current spatial orientation (e.g., spatial orientation at the moment of activation) to a previously-recorded spatial orientation associated with display device 102. In this way, a current spatial orientation recorded at the time of activation may be matched to a previously-recorded orientation associated with a display device such that selection device 114 may correctly determine the display device for content output desired by user 112. In one example, the previously-recorded orientation may be accessed from a database created during environment configuration of a multimedia environment.

In this example, display device 102, which user 112 desired to receive and output multimedia content, is correctly identified after activation of selection device 114. Content from source device may then be routed to display device 102. In some embodiments, selection device 114 may emit audio signals encoding selecting of display device 102 which may be received by source device 118, causing the source device to route multimedia content directly to the selected display device 102. Display device 102 accordingly outputs the multimedia content, represented in the figure by shading.

Although a first example is shown and discussed above, other embodiments are also considered. For example, the selection device may be configured to easily access all the display devices connected to a network. However, there may be many displays on the network that are not of interest to a user in the room. For example, a display may be in an adjacent room using the same wireless access point (AP.) In some embodiments, the selection device may broadcast a signal to all the displays and give each display an identifying number, such as an ID number, to show on the screen. Thus, in this example, all the displays in the room of interest may show their assigned identifying number. Displays outside the room (but on the network) may also show other numbers, or if being used, may not show anything. The selection device may point to each of the displays and the corresponding number of the display may be entered or optically read. This method may enable easy association of the network path with each display.

As described in more detail below, a user interface or application may be provided on the source device such that a user may enter the information for the network path to each display. In some embodiments, the selection device may obtain the information regarding the display in an automatic or semi-automatic process. In a semi-automatic process, the user may manually complete the process to enable association of the source device with a chosen or selected display.

As discussed above, multiple methods may be used to positively identify a display. Thus, as described above, spatial identification (such as use of a compass and gyroscope) may be used as part of the selection device. As another example, in embodiments where an identifying number has been assigned, the identifying number may be used to perform initial identification. Afterwards, the selection device may send a unique pattern to the display and optically read it back to ensure a positive identification when the round trip of information is completed.

The programmed information (display identification information) for a selection device for the displays in a room (whether through spatial orientation or identification numbers or other method), may be uploaded and stored. In some embodiments, this display identification information may be stored on the network and tagged to a room. As the display identification information may be specific to a room, when the selection device is moved to another room, a room identification mode may be used such that the selection device may identify the room. The identification mode may include a manual entry of room information, or an automatic or semi-automatic identification through spatial or image identification or other suitable method. Once the room is identified, the programmed information for that room may be downloaded to the selection device to enable selection of any one of the displays in the room.

It will be appreciated that in some embodiments, display device selection may be carried out by pointing selection device 114 in a direction substantially perpendicular to a display device or its surface and activating the selection device. For example, user 112 may select one of display devices 108 and 109 by pointing in a direction substantially upward in environment 100. Multiple display devices arranged in a single region of environment 100 (e.g., multiple display devices on a single wall or ceiling) may be distinguished from one another by separating the individual display devices into separate selection regions (e.g., angular regions), described in further detail below with reference to FIGS. 3A, 3B, 3C, 3D, 3E, 3F, and 3G. Thus, for example, display device 108 may be selected and distinguished from display device 109 by pointing selection device 114 in a direction substantially upward and leftward, and activating the selection device.

It will be further appreciated that in some embodiments, the position of selection device 114 may be in a different position and spatial orientation relative to a display device during identification of the display device and the spatial orientation of the display device within environment 100 and during selection of the display device for use. As described herein, a position of the selection device or display device refers to a location of the device in the environment. For instance, a position of a selection device may be indicated via coordinates (e.g., 3-dimensional coordinates). In one use-case example, environment 100 may include a projector located on a ceiling. The projector and the spatial orientation of the projector may be identified using selection device 114 from a fixed position relative to the projector. To enable selection of the projector from any other point within environment 100, the location of selection device 114 may be determined within environment 100 during identification and during selection of the projector. However, in other examples the location of the selection device 114 may not be determined at the time of display device configuration. A location of selection device 114 within environment 100 may be determined by triangulation of the position of selection device 114 using two or more fixed reference points within the room, device location components such as GPS location or other network based location systems, manually input by the user, or any other suitable method. As a non-limiting example, during identification of the projector, selection device 114 may be pointed at two or more reference points within environment 100. Selection device 114 may determine its location within environment 100 relative to each reference point. Selection device 114 may also be pointed at the projector (or any other display device within environment 100). The location and/or spatial orientation of the projector relative to each reference point within environment 100 may also be determined and recorded by selection device 114. As the location and spatial orientation of the projector relative to each reference point within environment 100 is recorded, the projector may be selected by selection device 114 from any position within environment 100 by first determining the position of selection device 114 relative to each reference point and then selecting the projector.

Such previously-recorded spatial orientations, for example during an environment configuration as outlined in method 400 at FIG. 4A, may be determined during a configuration phase in which selection device 114, for example with an integrated source device, is trained to identify and select the display devices in environment 100. Alternatively, the configuration phase may be carried out during execution of a configuration application executed on source device 118, described in further detail below with reference to FIG. 5A, and may implement a method 423, described in further detail below with reference to FIG. 4D. In some embodiments, the configuration phase may precede a use phase in which configuration has been completed, allowing a user to engage in display device selection and output control. As used herein, "identification" and "identifying spatial orientations" may correspond to the configuration phase in which display devices are identified, while "selection" and "selecting spatial orientations" may correspond to the use phase.

It will be appreciated, however, that the configuration phase may be implemented on another device other than source device 118, for example a configuration device 120 dedicated to configuring display device identification and selection. In one example, the configuration device may be a computer. In another example, the configuration device may be a device capable of network communication.

As described above, a system for configuring a multimedia environment, comprising a first display device and a second display device within the multimedia environment wherein the first display device and second display device includes display device information, comprising a display device identifier and a network connectivity; a configuration device within the multimedia environment, the configuration device coupled to the first display device and the second display device over a network is provided. The configuration device is programmed to receive from each of the first display device and the second display device the display device information, identify a spatial orientation for the first display device and the second display device, associate the identified spatial orientation with the received display device information for each of the first display device and the second display device, and store the associated identified spatial orientation and received display device information for the first display device and the second display device as configuration data in a configuration database. In one example, a spatial orientation of a display device may include directional and/or elevation angles or angle ranges corresponding to the display device. The directional and elevation angles may be associated with a references point, such as a central point in the room, for instance. Thus, the spatial orientation may be angulation information from a central point, a point on a floor, a point on a desk, a point on a podium, etc., or from the position of one or more moveable objects such as a remote control or projector. In this way, display device angulation can be tied to a reference point. Tying the reference point to the angulation information enables greater accuracy when determining which display device a user intends to select. Moreover, the reference point may be a point within the room in which the display devices are located or may be a point external to the room. For instance, the reference point may be a point on a desk contained in the room or a point on a floor in a hallway adjacent to the room. In this way, a user may be able to select display devices when they are located in an adjacent room or in the room where the display devices are located.

The system further comprises a server coupled to the configuration device. In one example, the configuration data in a configuration database is stored on the server. For example, the configuration data may be store on a server in the cloud or a server which is located in the room of the multimedia environment.

The configuration device is further programmed to: identify a room spacing alignment for the first display device and the second display device; associate the room spacing alignment with the first display device and the second display device; and store the associated identified room spacing alignment for the first display device and the second display device as configuration data in a configuration database. The room spacing alignment may include orientation data associated with the display devices corresponding to reference points contained within a specified room. As previously discussed, the reference point may be a point at the center of the room, a point on a desk, a point on a chair, a point on a projector, etc. The orientation data may include directional and/or elevation angles or angle ranges associated with the displays. For instance, a room spacing alignment corresponding to a first display device in a conference room may include a direction and elevation angle associated with a central point in the conference room. However, a room spacing alignment does not include angulation angles from orientation data associated with reference points external to a specified room.

The system further comprises a selection device coupled to the network, the selection device programmed to access the configuration database and select a desired display device. The selection device selects the desired display device by providing the orientation information of the desired display device and matching the information stored in the configuration database. As described herein, orientation information can include directional angle and/or elevation angle relative to and measured by the selection device. Moreover, the orientation information can be associated with a reference point, as described above.

The system further comprises a source device coupled to the selection device, the selection device further programmed to drive source multimedia from the source device to the desired display device.

The configuration device is further programmed to receive from a reference source reference data, the reference data comprising a room position, and store the reference data in the configuration database.

Turning to FIG. 1B, FIG. 1B shows an example schematic diagram of connections between devices during configuration. The selection device 114, configuration device 120, server 140 and cloud 142 may all be connected via a network 152, illustrated as dash dot lines, provided by the network device connections 116. In one example, the selection device 114 and configuration device 120 may be separate devices. In another example, the selection device 114 and the configuration device 120 may be integrated as a single device 150. The selection device 114 and configuration device 120 may be connected via the network to a server 140. The server 140 may be present in the multimedia room, outside the room, at various other locations, or be in the cloud. The configuration device 120 may communicate with the server 140 during configuration of a display device in the multimedia environment. The selection device 114 may communicate with the server 140 during selection of a display device in the multimedia room. The server 140 may include a database 142 which includes information about the display devices in the multimedia room. For example, the position and angulation of the display devices. In one example, the database 142 may be stored on the server 140. In another example, the database 142 may be stored in the cloud. In yet another example, the database 142 may be stored on an off-site storage server.

Configuring environment 100 for display device identification and selection on configuration device 120, for example, may allow configuration to be completed in a single session by an information technology professional before users arrive to the environment. Such an approach may advantageously allow information garnered during configuration (e.g., spatial orientations and connectivity identifiers associated with each display device) to be downloaded to the electronic devices of the respective users in environment 100 such that they may bypass configuration themselves and immediately point to drive display output selection. It will also be noted that a "use" phase during which display device output may be controlled via the spatial orientation and activation of selection device 114, and following the configuration phase described above in which selection device 114 and the display devices in environment 100 have been configured, may be controlled via a control application, which may also be executed on source device 118. For example, the control application may implement a method 451 described in further detail below with reference to FIG. 4E, and in some embodiments, may be combined with the configuration application to form a single configuration and control application.

Alternatively, the configuration phase may include recording geo-spatial location coordinates of environment 100, such as Radio Frequency Pattern Matching, wireless network location methods, GPS coordinates, or any other suitable geospatial location method, for example. These location coordinates may be associated with the spatial orientation and identification of display devices within environment 100. In some examples, geospatial location coordinates may be recorded for each of the display devices within the environment. The identification and spatial orientation of each display device within environment 100 and the geospatial location coordinates of environment 100 may be stored locally at configuration device 120 and/or remotely at a remote server or cloud server. Therefore, a source device 118 with geospatial locating functionality may provide geospatial location coordinates to an executed control application. The control application may match the geospatial location coordinates of source device 118 to the geospatial location coordinates of environment 100. The control application may then request a download from configuration device 120 or the remote server/cloud server of the identification of the available display devices within environment 100, the spatial orientation of the display devices, and the geospatial location coordinates of each available display device (if available). As discussed above this approach may advantageously allow information garnered during configuration to be downloaded to the electronic devices of the respective users in environment 100 such that they may bypass configuration themselves and immediately point to drive display output selection.

Thus, a configuration device, comprising: an orientation determining component configured to determine a room spacing alignment for a first display device and a second display device in an environment; an audio emission component configure to emit audio signals; a logic subsystem; and a memory subsystem holding instructions executable by the logic subsystem. The instructions are configured to: receive from a first display device and a second display device display device information; identify a room spacing alignment for the first display device and the second display device; associate the identified room spacing alignment with the received display device information for the first display device and the second display device; and store the associated identified room spacing alignment and received display device information for the first display device and the second display device as configuration data in a configuration database.

In one embodiment, a selection device is an integral selection device integrated with the configuration device. The selection device configured to: access the configuration database from the selection device; determine a selecting spatial orientation at the selection device; associate the selecting spatial orientation with the configuration database to determine a desired display device and the associated data; and wherein the orientation determining component includes one or both of a compass and a gyroscope. As previously discussed, the spatial orientation may include directional and/or elevation angles or angle ranges.

In one example, the orientation determining component includes one or both of a compass and a gyroscope.

In other embodiments, the configuration device is further programmed to: receive from a reference source a room position; and store the reference source room position as configuration data in the configuration database.

Turning now to FIG. 2, a schematic diagram 200 is shown, illustrating in schematic form elements of a selection device 202 which may be used to identify and select display devices in environment 100 for multimedia content output. Diagram 200 may represent one or more elements of selection device 114 or another separate device suitable for display device identification and selection (e.g., a smartphone, tablet computer, handheld gaming console, personal data assistant, a dedicated device whose primary function is to perform the selection process, etc.).

Selection device 202 may include a power source 204 configured to supply electrical power to various active components in selection device 202. Power supply lines to such components are represented in the figure by dot-dash lines. Power source 204 may be any suitable power source, for example a replaceable and/or rechargeable lithium-ion, alkaline, or nickel-cadmium battery, or a power supply unit configured to receive electrical current from a wall outlet (not shown). Power source 204 may provide electrical power to a communication (comm.) subsystem 206, an input subsystem 208, a speaker 210, a camera 212, a logic subsystem 214, and a memory subsystem 216.

Communication subsystem 206 may facilitate communication between selection device 202 and various devices in environment 100 to drive display device selection and multimedia content output, for example display devices 102, 104, 106, 108, and 110, and network device 116. Communication subsystem 206 may correspond to and/or interface with various physical devices to implement such communication, for example an Ethernet port, wireless transceiver, universal serial bus port, etc. The configuration and/or use applications described above may be downloaded to selection device 202 via communication subsystem 206.

Input subsystem 208 may facilitate the reception of user input at selection device 202. Input subsystem 208 may correspond to, for example, a touch screen, microphone, physical button, etc., and may be used to receive user activation indicating identification and/or selection of a display device.

Speaker 210 may be any suitable device configured to emit audio signals in one or more frequencies (e.g., audible, subaudible, ultrasonic, etc.). In some embodiments, speaker 210 may emit audio signals having encoded therein information representing display device identification and/or selection. Audio signals may be emitted to display devices themselves in environment 100, for example. Alternatively or additionally, in some embodiments audio signals may be emitted to a separate source device (e.g., source device 118) such that selection device 202 may be used as a pointing device to drive multimedia content output by emitting information upon activation to the separate source device. An exemplary pointing device 700 is described below with reference to FIG. 7. In some embodiments, the audio signals may be encoded via any suitable technique (e.g., frequency-shift keying (FSK), phase-shift keying (PSK), Trellis modulation, quadrature amplitude modulation (QAM) coding) and may include spatial orientations and/or connectivity identifiers.

Camera 212 may be any suitable image capture device configured to capture light in one or more wavelengths (e.g., visible, infrared, etc.), and may include a lens and a complementary metal-oxide-semiconductor (CMOS) or charge-coupled device (CCD) sensor, for example. In some embodiments, camera 212 may capture images containing information relevant to display device selection, described in further detail below.

Logic subsystem 214 may be configured to execute instructions, routines, and other code stored in memory subsystem 216 to drive display device selection, and may include a memory controller (not shown) configured to facilitate an interface between the logic and memory subsystem. Logic subsystem 214 may carry out a method, for example methods 423 and/or 451 described below with reference to FIGS. 4A and 4B respectively, as part of a configuration and/or control application used to drive display device selection and output. Logic subsystem 214 may be any suitable logic device configured to execute instructions stored in memory subsystem 216, such as a processor or microcontroller. Likewise, memory subsystem 216 may be any suitable storage device configured to store instructions executable by logic subsystem 214, such as electronically erasable programmable read-only memory (EEPROM), a hard drive, flash memory, etc. In some embodiments, memory subsystem 216 may further store information received during a configuration phase in which selection device 202 is trained to select display devices in environment 100, described in further detail below with reference to FIG. 4E.

Data connections—e.g., pathways which facilitate the transmission of electronic data—are illustrated in the figure by solid lines, which may be, for example, data busses. As shown, data connections connect logic subsystem 214 to communication subsystem 206, input subsystem 208, speaker 210, camera 212, memory subsystem 216, a microphone 217, a compass 218, and a gyroscope 220. Such data connections may be a combination of one-way and two-way connections; for example, a two-way data connection may be provided between memory subsystem 216 and logic subsystem 214, while a one-way data connection may be provided between speaker 210 and logic subsystem 214. It will be appreciated that two or more of the above-described components (e.g., memory subsystem 216 and logic subsystem 214) may be integrated onto a single die or provided as separate components in selection device 202.

Microphone 217 may be any suitable device configured to receive audio signals emitted in environment 100. In some embodiments, one or more of display devices 102, 104, 106, 108, and 110 may include speakers configured to emit information relevant to display device identification and/or selection (e.g., information indicative of spatial location and/or connectivity identifiers) which may be received by selection device 202 via microphone 217. In other embodiments, environment 100 may include a reference source configured to emit audio signals to thereby improve determination of the spatial orientation of selection device 202 and one or more displays in the environment.

In yet other embodiments, selection device 202 may include an orientation-determining device or component configured to determine the orientation of selection device 202. As a non-limiting example, the orientation-determining device may include one or more of a compass 218, a gyroscope 220, a global positioning system (GPS) device, an accelerometer, x-y-z Cartesian coordinate sensor, etc. The orientation-determining device may be used to determine the spatial orientation of selection device 202 upon its activation by a user. Such orientation may then be recorded and stored in memory subsystem 216 and subsequently associated with one or more connectivity identifiers. In this way, a display device in environment 100 may be identified by associating a spatial orientation and one or more connectivity identifiers with the display device, such that the display device may be subsequently selected by comparing a spatial orientation during selection with the orientation previously-recorded during configuration. It will be appreciated that the orientation-determining device may be integrated in, connected to, linked to, or otherwise operable with selection device 202.

In one example, the inclusion of compass 218 and/or gyroscope 220 may operate synergistically to provide orientation data regarding selection device 202. In some examples, compass 218 may be used to determine a reference point, for example, the point at which selection device 202 points due north. At this point, the orientation of gyroscope 220 (e.g., its output) may be recorded and associated with due north. It will be appreciated that other reference points may be used. As selection device 202 is manipulated, subsequent gyroscope orientations may be compared to the gyroscope orientation associated with due north to thereby determine the spatial orientation and/or pointing direction of the selection device. Such an approach may allow selection device 202 to determine its spatial orientation and/or pointing direction in a 360° angular range, for example.

Further, in some examples, compass may be used to determine a horizontal pointing direction (horizontal directional signal) which indicates the horizontal direction pointing direction when the selection device is held more or less horizontal. The gyroscope can then be used to determine an up or down directional signal. By the combination of the compass and gyroscope to determine the horizontal directional signal, it is possible to determine a 3-dimensional spatial orientation or pointing direction which assists in selecting vertically separated displays and displays mounted on the ceiling.

Compass 218 and/or gyroscope 220 may include respective transducers configured to translate their physical states into electrical signals interpretable by logic subsystem 256, such as analog-to-digital converters. Such electrical signals may encode spatial orientations in any suitable form, for example, three-dimensional Cartesian coordinates associated with selection device 202, and may include other orientation data such as the yaw, pitch, and roll associated with the selection device.

It will be appreciated, however, that the inclusion of various components in selection device 202 may be varied. For example, one or more of camera 212, microphone 217, compass 218, and gyroscope 220 may be included or omitted. The inclusion of compass 218 and/or gyroscope 220 while omitting camera 212 and microphone 217 may reduce costs at the expense of decreased accuracy. Turning back to FIG. 1A, an example illustrating the relative accuracy of selection device 202 as a function of the inclusion of various orientation-determining devices is illustrated. In embodiments in which selection device 202 includes compass 218 and/or gyroscope 220 while omitting camera 212 and microphone 217, the selection device may be capable of selecting displays which are substantially separated (e.g., by an angle that allows sufficient tolerance to easily distinguish one display device from another). In the example shown in FIG. 1A, user 112 may thus select among display devices 102, 104, 106, and 110.

In some examples, an external reference may be detected by the addition of a camera 212 or microphone 217 to enable precise orientation and selection capabilities. In other embodiments, selection device 202 may be capable of gross determination of spatial orientations, with fine determination achieved by the inclusion of a capture device. For example, in some embodiments the orientation of selection device 202 may be determined in relation to an external reference not limited to environment 100 (a compass direction and gyroscope data may only facilitate determination of pointing orientation relative to the earth).

In the example of gross determination, display device selection may be able to differentiate between a number of display devices, four, five, or six display devices (e.g., a display surface on each perpendicular surface of environment 100). The display selection may be limited to the selection of perpendicular display devices, for example by comparing the spatial orientation of a display device undergoing selection to a previously-recorded spatial orientation for a separate display device. If an angle between the display devices is less than 90 degrees, for example, selection of the new display device may be suppressed and a notification or request for verification sent to user 112. Selection device 202 may be in different positions within environment 100, and with the inclusion of an external reference, the accuracy by which the selection device may determine the display device to which it is being pointed may be increased.

Other approaches may be utilized to aid in display device identification and/or selection for embodiments in which selection device 202 lacks a camera or microphone. FIG. 3A shows a plan view of a multimedia environment 300 in which four display devices (numbered sequentially in the figure) are mounted side-by-side on a single wall, similarly to display array 110 in environment 100. During configuration of selection device 202, the wall may be divided into several separate angular regions (e.g., angular regions 302 and 303). Angular regions associated with each display device (e.g., angular region 302) may subtend 22.5°, for example. Each display device may then be associated with its own specific angular region. Spatial orientations recorded during activation of selection device 202 after completion of the configuration phase may then be matched to an angular range. In this way, a pointing tolerance may be provided and close-packed display devices mounted on a common wall may be distinguished from one another. In some embodiments, selection device 202 may be located in various positions within the room. In this case, selection device 202 may determine the orientation angles relative to a position of selection device 202 within multimedia environment 300. Thus, a directional and/or elevation angle or angle range of the selection device may be associated with a room location of the selection device. Selection device 202 may select at least two fixed reference points within the room to determine the position of selection device 202 within multimedia environment 300. Additionally, the location of the display devices and/or angular regions may be determined relative to the at least two fixed points.

Other variations are possible. In some approaches, it may be desirable to expand some angular regions while restricting others. For example, some angular regions may correspond to regions in which users may intuitively direct pointing. FIG. 3A shows how a horizontal line 304 may be used to adapt angular regions to user tendencies. An expanded angular region 306 is shown, extending from horizontal line 304 to the middle of a surface of display device 1. Expanded angular region 306 may subtend, for example, 57.7°. When a user desires to select display device 1, the user may direct pointing in directions not only intersecting the surface of display device 1, but also directions intersecting portions of a left wall of multimedia environment 300. Directions intersecting portions of this left wall, extending to horizontal line 304, may result in successful selection of display device 1. In this way, ease of display selection, and associated pointing tolerance, may be increased. A similar angular region may be provided for display device 4 as the user may have a tendency to select display devices disposed in corners with pointing directions intersecting proximate sidewalls.

Although the angular regions associated with display devices 2 and 3 may be reduced in this example (e.g., subtending 20.4°), pointing directions resulting in selection of an unintended display (e.g., selection of display device 3 when selection of display device 2 was intended) may be mitigated by also leveraging user intuition. For example, a user accidentally selecting display device 3 may observe multimedia content being routed to this display device and promptly provide a new pointing direction toward a left side of multimedia environment 300 in response.

In addition, in some examples, the angular region for the central based displays may be increased. For example, the angular region for display device 2 may extend from the center line to a shifted position indicated by the dash-double dot line. This expanded region may be based on the likelihood or tendency that a user will position the selection device by pointing toward the corner for display device 1 and in a more general but not specific region off the center line for display device 2. Although shown as positioned at the mid line of the angular region of display device 1, it will be appreciated that the shift position may be of any suitable size, expanding or reducing the selection zone for a display.

It is noted, in some examples, during a configuration phase in which display device selection is configured, the location of a user and selection device 202 may be provided to increase pointing ease and accuracy. Further, data regarding position of a user (based on size, obstructions in the room, such as conference tables, etc.) may be determined such that the selection zones are customized to the room. Tolerances, such as the selection zone, may be adjusted based on the likelihood of a user's position when using the selection device.

Some devices may require manual verification due to overlap in a selection zone or movement of a display. For example, a wheeled display may change the compass heading and adjustments may be necessary or user verification or confirmation of a selected device. Likewise, a default may be set for a display where overlap occurs based on position of the user in pointing at a display. The user may be able to verify or request reselection of a display.

Turning to FIG. 3B, FIG. 3B shows a partial view of another multimedia environment 350, illustrating how four display devices (numbered sequentially) mounted on a common wall in a two-by-two configuration may be distinguished from another, similarly to the approach described above with reference to FIG. 3A. In this example, two display devices at the top of the two-by-two arrangement devices may be separated from two display devices at the bottom of the arrangement by a horizontal line 352, while two display devices at the left side of the arrangement may be separated from their rightward counterparts by a vertical line 354. Thus, a spatial orientation of selection device 202 may be compared to horizontal lines 352 and vertical lines 354, respectively, to determine which quadrant (e.g., quadrant 356) is being pointed at. Pointing tolerance and ease of use of selection device 202 may be increased in such an approach. It will be appreciated that the above-described methods in which a wall is divided into regions may be extended to environments having other numbers of display devices, and such display devices may be divided into regions using any suitable geometrical configurations. For example, display devices may instead be divided into circular or elliptical regions. Further, the separation of display devices into regions and the selection of such displays based on regions may be encoded in instructions stored on memory subsystem 216 and executed by logic subsystem 214 of selection device 202, for example.

Turning now to FIG. 3C, multimedia environment 300 may include a plurality of display devices 318, 320, 322, 324, 326, 328, 330, 332, and 334. Each of the display devices may include a single display device or two or more display devices forming a composite display device as illustrated in display devices 322 and 324 of FIG. 3D. As illustrated, selection device 202 may be used to receive the spatial orientation of any of the display devices in multimedia environment 300 as shown by the dash double dot lines. Further, selection device 202 may receive the spatial orientation of one or more reference sources within the multimedia environment 300. For example, multimedia environment 300 may include four reference sources 310, 312, 314, and 316. These reference sources may be used during both configuration and device selection. Although each reference source is shown in a respective corner of the room, it will be appreciated that a reference sources may located at any suitable location within multimedia environment 300, such located on a wall, an intersection of two walls, on the floor, on the ceiling (e.g., ceiling corners), or on any static feature of multimedia environment 300. It will also be appreciated that in some embodiments, the reference sources may be located on other fixtures which may be placed within multimedia environment 300 during the configuration phase.

In these embodiments, the fixtures may remain in place until use of multimedia environment 300 is complete. Reference sources 310, 312, 314, and 316 may comprise a visual marker, sound emitter, wireless signal transmitter, radio transmitter, or any other suitable marker or transmitter that may be detected by selection device 202.

In some embodiments, the corners of the room may be employed as reference sources.

During the configuration phase, selection device 202 may receive the spatial orientation of each reference source 310, 312, 314, and 316. The spatial orientation of each reference source may then serve as a fixed point or "landmark" within multimedia environment 300 from which the spatial orientation of each display device and the location of selection device 202 may be determined. A location of selection device 202 within multimedia environment 300 may be determined through any suitable location algorithm such as triangulation, trilateration, multilateration, stereopsis, or any other method of calculation of position relative to one or more reference points. Selection device 202 may also receive the spatial orientation of each of the display devices 318, 320, 322, 324, 326, 328, 330, 332, and 334 and associate the spatial orientation relative to the reference sources. A change in position of selection device 202 between the configuration phase and selection of a display device may change the spatial orientation of each display device relative to selection device 202. By determining the spatial orientation of each display device and selection device 202 within multimedia environment 300 relative to reference source 310, 312, 314, and/or 316, any difference in spatial orientation of a display device due to a change in the position of selection device 202 may be corrected for and the proper display device may be selected.

In other embodiments, the spatial orientation of the reference sources as determined by selection device 202 may be corrected to a specific reference point within multimedia environment, such as a reference point in the center of multimedia environment 300. Shifting the reference point to the center of the multimedia environment increases the accuracy of device selection. Consequently, the likelihood of selection of a desired display device is increased. The reference point may be the position of selection device 202 within multimedia environment 300 during the configuration phase and during receiving of a respective identifying spatial orientation of each of the one or more display devices. In this embodiment, the spatial orientations of the display devices determined during configuration may be similarly corrected. For instance, during configuration the spatial orientation assigned to each display device may correspond to a reference point that is shifted to a central point in the room. As a result, a common reference point can be established during device configuration and device selection. Consequently, the accuracy of display device selection is increased.

As a non-limiting example, a change in relative position between selection device 202 and display device 332 will be discussed. Display devices 332 and 334 may be projectors mounted to the ceiling of multimedia environment 300. During the configuration phase, the spatial orientation of the reference sources, location P1 of selection device 202, and the spatial orientation of each display device within multimedia environment 300 may be received as illustrated. During the selection of display device 332, selection device 202 may be located adjacent display device 318 at location P2. To account for this change in position, selection device 202 may receive the spatial orientation of one or more of reference sources 312, 314, 316, and/or 318 from the location P2. The location of selection device 202 at P2 within multimedia environment 300 may be determined relative to the spatial orientation of the one or more reference sources. The change in location of selection device 202 may change the spatial orientation of each display device relative to selection device 202 when a display device is selected from P2. Therefore, an expected spatial orientation of each display device may be determined based on the difference in spatial orientation of each reference source at P2 and the spatial orientation of each reference source at P1. Selection device 202 may then select display device 332 from the current location despite the change in relative location between selection device 202 and display device 332. It will be appreciated that the spatial orientations of the reference sources prior to selection of display device 332 may be received automatically or manually.

In some embodiments, the spatial orientation of a reference source within multimedia environment 300 may be used to determine elevation of a display device or other multimedia device. As illustrated in FIG. 3D, display device 322 may include two devices 322A and 322C and display device 324 may include two devices 322B and 322D. Dashed line 340 may indicate 0 degrees elevation. Also illustrated are a 10 degree elevation line and a 350 degree elevation line (10 degrees below dashed line 340). It will be appreciated that alternative forms of expressing relative elevation such as positive/negative degrees, radians, azimuth angles, etc. Further, it will be appreciated that the elevation of a display device may be determined from the center of the display device as illustrated, from the bottom of the display device, from the top of the display device, from a corner of the display device, or any other point on the display device. In these embodiments, the spatial orientation of a display device may include both position and elevation data associated with the display device. For example, the display devices 322A and 322C may have similar spatial orientations if elevation is not determined and included with or within the spatial orientation associated with each display device. The inclusion of elevation may allow the selection of either display device 322A or 322C individually, as display device 322A has an elevation of 10 degrees and display device 322C has an elevation of 350 degrees. In other applications, the elevation of a display within a multimedia environment may allow for increased precision of the selection of a display device.

Further, in another embodiment, the accuracy of the room layout and therefore the position of the display devices may be improved by utilizing the selection device to record the directions of the four corner of the room. Illustrated in FIG. 3E, an example schematic for mapping display devices by recording the direction of the four corners of the room in a multimedia environment in accordance with an embodiment of the present disclosure is shown. This would allow for the measured angles to be translated to the reference point at the center of the room. For example, as illustrated in FIG. 3E, the selection device 202 is positioned at 370 and is not positioned at the center of the room at 380. By recording the direction of the four corners of the room, the center of the room may become known. The display devices spatial orientation relative to the selection device position, at 370 may be translated to as though measured at the center of the room, 380. This allows better accuracy of selection even if the configuration was performed at more fringe positions within the room. For example, illustrated in FIG. 3G is the orientation information mapped subsequent to recording the direction of the four corners of the room with the direction or position of the display devices shown. FIG. 3F shows the partitioning of the room into different angular ranges for each display device. Position 370, shown in FIG. 3E is used as the reference point, for partitioning the room into angular ranges in FIG. 3F. On the other hand, FIG. 3G shows the angular ranges corrected to have position 380, shown in FIG. 3E, used as the reference point for determining angular range partitions. Translating the reference point for angular partitioning to the center of the room increases device selection accuracy.

In FIG. 3F, an example schematic for mapping display devices in a multimedia environment in accordance with an embodiment of the present disclosure is shown. The configuration information indicates the location of the display devices within a multimedia environment. In the illustrated example, in reference to the positioning of display devices shown in FIG. 3C, the display devices may be mapped based on their direction and elevation. For example, from the position of the selection device as illustrated in FIG. 3C, display 318 is in front of the selection device and therefore at a direction or position of 0°. In the same manner, the direction/position of display devices within the multimedia environment may be obtained. Continuing with the example multimedia room of FIG. 3C, the positions illustrated in FIG. 3E shows displays 320 and 324 between 45° and 135°, with display 324 further being recognized as having an elevation of 45° relative to the selection device, display 322, between 135° and 180°, display 324 between 180° and 225°, display 326, 328 and 330, which may be a three by one array (all at the same elevation), being detected as having 326 between 225° and 255°, 328 between 255° and 285°, 330 between 285° and 315°. Thus, based on the relative angle of the display device and the elevation, the orientation information may be mapped as illustrated.

In FIG. 3G, an example schematic for mapping display devices in a multimedia environment in accordance with an embodiment of the present disclosure is shown. FIG. 3G shows the assigned ranges of angles associated with different displays if the selection device were positioned in the center of the room. In the example shown in FIG. 3G, the display device 318 is still in front of the selection device and at a direction or position of 0°. However, the other display devices are at different angles to the selection device, as the selection device is positioned at the center of the room. Thus, the direction and position, i.e. the spatial orientation, of the display devices may change. For example, the display devices 326, 328 and 330, which may be a three by one display, would have a different relative angle from the selection device as compared to the mapping illustrated in FIG. 3F. The display device 326 is between 215° and 252°, 328 is between 252° and 288°, and 330 is between 288° and 325°. Thus, by determining the room layout during a configuration step, for example by determining the directions of the four corners of the room, the display device position and angulation may be translated from a reference point not at the center of the room to a position near the center of the room. While this example illustrated a room with four corners, a room having more or fewer corners may also be measured in a similar manner. Further, a room having no corners, for example a circular room may include reference points to be measured. In one example, the reference points may be an object affixed to the wall.

It will be appreciated that any suitable pointing direction may be assigned to selection device 202. In one example, a reference point used to quantify the pointing direction may be determined by a compass in the configuration device and/or selection device. In such an example, a predetermined angle/cardinal direction (i.e., 0 degrees (north), 90 degrees (west), 180 degrees (south), 270 degrees (east), etc.) may be used as the reference point. In some examples, a default reference may be to use north (0 degrees) as the reference point. However, other techniques for determining a common reference point have been contemplated. As shown in FIG. 1A, for example, a pointing direction extending outwardly from selection device 114 and substantially parallel with its longest dimension is assigned to the selection device. Thus in this example, user 112 is pointing in a direction substantially perpendicular to display device 102, the direction represented by the dotted axis. Any other suitable pointing directions may be assigned, however, including those determined by user 112. As another example, the pointing direction may extend in a direction substantially perpendicular to a display screen of a selection device. Further in one example, after the orientation of each display device in the system is recorded during configuration, 360 degrees may be partitioned to assign as the ranges within which each display device is considered located. For example, in the simple case of a square room with one display on each of the four walls and the configuration can be done with the selection device at the center of the room, each display device will be assigned a range of 90 degrees, for instance. During the selection process, pointing the selection device anywhere within that assigned 90 degrees range will select the device, in such an example. It will be appreciated that in certain scenarios the display devices in the room may be large and the number of displays in the room may be low. Therefore, very rough pointing will be able to select a desired display device. Additionally, if there are many tightly packed small display devices in the room a feedback mechanism can also be used to pinpoint the devices. If, as in some scenarios, the pointing direction coincides with an upper or lower limit of a threshold (e.g., 85°), or within an otherwise ambiguous region, a confirmation may be requested of a user performing pointing. The confirmation may be implemented in any suitable fashion, such as via a prompt in a graphical user interface of a software application (e.g., control application 550 of FIG. 5B), or an easily identifiable sequence of audible beeps from selection device 114. As another example in which an ambiguous pointing direction corresponds to two display devices, a message may be outputted to and displayed by each display device requesting the user to confirm selection, for example by providing a new pointing direction.

Returning to FIG. 2, the accuracy and number of display devices selectable by selection device 202 may be increased via the inclusion of camera 212 and/or microphone 217. As shown in FIG. 1A, environment 100 may include a reference source 122 configured to emit a signal detectable by selection device 202 to thereby improve the determination of its spatial orientation. In some embodiments, reference source 122 may be a light source configured to emit light (e.g., infrared light), an identifiable symbol, a reflective sticker (e.g., a sticker configured to reflect infrared light), or multiple light sources detectable by camera 212. The position of reference source 122 in an image captured by camera 212 may be compared to a spatial orientation recorded for a display device undergoing selection. In embodiments where reference source 122 may have multiple light sources separated by a pre-determined, known, and fixed distance, detection of the reference source by camera 212 may enable selection device 202 to determine distances to display devices. Additional reference sources may be included in environment 100, for example at each wall. Reference source 122 may further aid in the determination of the orientation of a selection device which lacks a compass and gyroscope. Such a selection device, for example, may receive data from a fixed transmission source (e.g., a proximate antenna emitting electromagnetic signals) and compare the received data to that of the reference source.

Camera 212 may alternatively or additionally detect other light sources or other optically reflective signs or stickers to improve orientation and distance determination. For example, camera 212 may evaluate the position of light in a captured image and emitted by a secondary display device 123, located proximate to display device 104 to improve location of the display device. Logic subsystem 214 of selection device 202 may further evaluate information encoded in light emitted by secondary display device 123, which in this example includes a hash or number sign. The number sign is a symbol specifically associated with display device 104 to identify the display device. It will be appreciated, however, that any suitable identifier may be displayed by secondary display device 123.

Similarly, display devices themselves may display information relevant to display device identification and/or selection which may be detectable by camera 212 of selection device 202. For example, FIG. 1A shows how display device 104 may itself display identifying information in the form of a quick response (QR) code, an image of which may be captured by camera 212 and interpreted by logic subsystem 214 of selection device 202.

Continuing with FIG. 1A, camera 212 may further capture an image or a sequence of images of a set of lights 124 (e.g., set of LEDs) included on a bezel of display device 104. Set of lights 124 may collectivity emit a pattern encoding orientation information or one or more connectivity identifiers associated with display device 104 in a unique on/off pattern. Still further, camera 212 may capture an image of an identifying mark 126, which may also encode identifying information specific to display device 104. Identifying mark 126 may encode such information, for example, in a unique geometric and/or color pattern.

Alternatively or additionally, selection device 202 may utilize microphone 217 to improve display selection. In some embodiments, reference source 122 may be a sound source emitting an audio signal (e.g., an ultrasonic signal) detectable by microphone 217 to improve display device location. It will be appreciated that although described as an ultrasonic signal, the audio signal may be an audible signal, a subaudible signal, etc., and may span any suitable frequency spectrum. Microphone 217 may also be utilized to detect audio signals emitted from speakers included in one or more display devices, such as display speaker 128 included in display device 104. It will be appreciated that any of the audio sources, light sources, and identifying marks described above, including reference source 122, secondary display device 123, set of lights 124, identifying mark 126, display speaker 128, and QR code 130 may encode one or more connectivity identifiers or other additional information, such as a secondary reference point, specific to the display device to which they are associated. Thus, additional information, including information to establish a secondary reference point in an environment, may be encoded via one or more of a secondary display device, a set of lights, an identifying mark or other signals emitted or presented by the one or more display devices.

For example, set of lights 124 may emit a light pattern encoding the IP address of display device 104. Such a pattern may then be captured by camera 212 and interpreted by logic subsystem 214 to drive display device selection. In embodiments in which a network linking one or more display devices in environment 100 has been properly configured, connectivity identifiers have been associated with such display devices, and selection device 202 includes camera 212, the configuration phase training display device identification may be bypassed, as selection device 202 may be used to capture information identifying a desired display device and subsequently drive multimedia content output according to the identifying information.

Turning now to FIG. 4A, an example method 400 is shown for configuring a multimedia environment, also referred to as environment configuration, of one or more display devices for a multimedia environment using a configuration device. In one example, the environment configuration of the one or more display devices for a multimedia environment may be done using a configuration device, for example as shown in FIG. 1A. In another example, the environment configuration of the one or more display devices for a multimedia environment may be done using a selection device which has an integrated configuration device. Environment configuration may be done to determine the room position and room angulation of the display devices. Environment configuration may be done as an initial set-up of a multimedia environment. Environment configuration may further be done when display devices are added or removed from a multimedia environment. Environment configuration may include reference sources in the multimedia environment. Additionally, environment configuration may be done by a technician or a user.

At 402 of method 400, the configuration device may receive a connection. For example, the configuration device may receive a connection to the network over wifi. In other examples, other protocols may be used to connect the configuration device to a network. The configuration device may receive the connection by selecting the network address for the multimedia room.

At 404 of method 400, the configuration device may receive display device information. The configuration device may receive information about the display device by scanning a QR code, manually inputting information, or through other methods of electronically communicating.

At 406 of method 400, the configuration device may receive configuration data. Configuration data may include room position of the display device, room angulation of the display device, network connectivity of the display device, display device identifier, etc.

At 408 of method 400, the configuration device may create a configuration database. In one example, the configuration database may be created on a local server. In another example, the configuration database may be created on an external server. In yet another example, the configuration database may be created on a server in the cloud.

At 410 of method 400, the configuration device may store the configuration data. The configuration data received at 406 may be stored in the configuration database created at 408. Thus, the display device information may be stored for retrieval at a later point.

The method 400 may then end. Thus, a method for configuring a multimedia environment is provided which may be used to configure one or more display devices present in a multimedia environment. In one example, the method for configuring a multimedia environment may be run by a technician setting up the multimedia environment. In another example, the method for configuring a multimedia environment may be run by a user in the multimedia environment. In yet another example, the method for configuring a multimedia environment results in a database with stored configuration data for the one or more display devices located in the multimedia environment. The method for configuring a multimedia environment may be used to update display device information, for example if a display device is moved to a new position within the multimedia environment.

Turning to FIG. 4B, an example selection method 411 is shown to select a display device using a selection device in a multimedia environment. For example, a selection device may be used to select a desired display device present in a multimedia environment, for example a display device previously configured during example configuration method 400.

At 412 of method 411, the selection device may connect to the multimedia environment. The selection device may connect to the multimedia environment on a network connection. The selection device may connect via wifi, LAN, etc. In one example, the selection device may connect to the network by manually inputting an IP address. In another example, the selection device may connect by scanning nearby wireless signals and selecting the wireless with the correct multimedia environment identifier, for example as posted near a door in the environment.

At 414 of method 411, the selection device may receive the desired display device. The desired display device may be received by pointing the selection device.

At 416 of method 411, the selection device may receive display device identifiers for the desired display device. For example, the display identifiers may be received from the database created during configuration of the display devices.

At 418 of method 411, the selection device may confirm the display device. For example, the display device may output an image or auditory signal and the selection device may confirm that display device for use. The method 411 may then end.

Turning to FIG. 4C, an example display method 419 is shown. The display method may drive multimedia content from a source device to a display device, for example a display device selected during example selection method 411.

At 420 of method 419, the source device may be associated with the selected display device.

At 422 of method 419, the source device may drive content to the selected display device. In this manner, a presentation or video, for example, on a source device may be transferred from the source device to the selected display device. The method may then end.

Thus, a method for configuring a multimedia environment is outlined above. The method includes configuring the room position of a display device, for example one display device, two display devices, or a plurality of display devices. The display devices may be, for example, a monitor, a TV, a projector, or a display device as previously described.

In one example, the method for configuring a multimedia environment comprises receiving from a first display device and a second display device display device information. The display device information comprises a display device identifier and a network connectivity. The display device information is received at a configuration device coupled to the first display device and the second display device over a network connection. The method includes identifying a room position for the first display device and the second display device, associating the identified room position with the received display device information for the first display device and the second display device, and storing the associated room position and display device information for the first display device and the second display device as configuration data in a configuration database.

The method further comprises accessing the configuration database from a selection device; receiving a room position at the selection device from at least one of the first display device and second display device; and associating the received room position with the configuration database to determine a desired display device.

The method further comprises connecting the selection device to a source device, the source device comprising multimedia content, and driving multimedia content from the source device via the selection device to the desired display device. In one example, the source device is an external source device and operatively coupled to the selection device. In another example, the source device may be integrated with the selection device, the configuration device, or both. Additionally, in one example, the source device and the at least one of the first display device and the second display device are connected to one or more telecommunications networks for use in sending multimedia content from the source device to the desired display device.

The method further comprising, prior to driving the multimedia content from the source device, encoding the display device identifier associated with the desired display device into an encoded signal and sending the encoded signal to the source device. In one example, the encoded signal is an audio signal.

The method further comprising receiving a reference data from a reference source, the reference data comprising a room position; associating the reference data with the reference source; and storing the associated reference data in the configuration database. For example, the reference source may be the corners of the room as previously described with respect to FIG. 3C.

Turning now to FIG. 4D, a method 423 is shown for configuring a device to identify and select one or more display devices for multimedia content output. Although method 423 will be described with reference to selection device 202 of FIG. 2 and environment 100 of FIG. 1A, it will be appreciated that the method may be carried out by other devices capable of determining their spatial orientation and communicating information to a network device or display devices. With respect to selection device 202, method 423 may be implemented in instructions stored on memory subsystem 216 and executed on logic subsystem 214.

At 424 of method 423, a configuration application is executed on selection device 202 or another device such as configuration device 120 of FIG. 1A. The configuration application may be downloaded and installed by a user prior to entering the environment in which output selection is to take place, or may be stored on a device in the environment and downloaded therefrom. For example, configuration device 120 in environment 100 may store the configuration application which may then be downloaded via communication subsystem 206 of selection device 202. The configuration application may train the selection device to identify and select display devices in the environment.

At 426, display devices in the environment may be identified on one or more networks. For example, selection device 202 may establish a connection via communication subsystem 206 with network device 116 to obtain a list of display devices connected to the network device and their associated connectivity identifiers specific to that network (e.g., IP addresses). Turning now to FIG. 5A, an exemplary configuration application 500 having a graphical user interface (GUI) 502 is shown, which may be executed on selection device 202 in embodiments in which the selection device includes a display screen (e.g., a touch screen on a smartphone). A window 504 reports that the selection device is connected to a LAN and that four display devices have been identified on that LAN. Window 504 further reports that a configuration phase has been initiated in which selection device 202 is trained to drive display device output selection. A region 506 toward the right side of GUI 502 lists each identified display device, their associated names, and their associated connectivity identifiers, which in this example are IP addresses specific to the LAN.

Returning to FIG. 4D, at 428 of method 423, a display device identification selection is received via configuration application 500. An "identification selection" as used herein may refer to a user selecting a display device to be identified as opposed to used, as the display device has not yet been configured for use. The selection may be physically received via input subsystem 208 of selection device 202. FIG. 5A represents such a selection. As shown in GUI 502, and particularly in region 506, "Interactive Whiteboard 2" has been selected, the selection represented in the figure by the bolded border and shading. Window 504 accordingly reports the selection, indicating that Interactive Whiteboard 2 is currently undergoing identification.

At 430 of method 423, a display identifier may optionally be routed to the selected display device, which in this case corresponds to Interactive Whiteboard 2. FIG. 6 shows an exemplary display identifier which may be routed to a display device undergoing identification. In this example, an exemplary display device 600 is shown displaying a display identifier 602. Display identifier 602 indicates that display device 600 is undergoing identification and that the device used to identify the display device (e.g., selection device 202) must be activated for the display device to be configured for use. Display identifier 602 also reports the name of the display and its associated connectivity identifier (e.g., IP address).

At 432 of method 423, selection device 202 orientation data is determined upon activation of the selection device. In one example, activation may be carried out by pressing, clicking, or otherwise engaging a button 508 in GUI 502, labeled "IDENTIFY". Upon activation, the spatial orientation of selection 202 may be determined by evaluating measurements produced by elements described above—e.g., compass 218 and/or gyroscope 220. Orientation data determined here at 432 may correspond to an identifying spatial orientation as described above, and may be respective to the display device undergoing identification—in other words, associated with the display device. Determination of the spatial orientation of selection device 202 may further include at 434 receiving and comparing orientation data garnered from a reference source (e.g., reference source 122 in environment 100) with the selection device orientation data (e.g., identifying spatial orientation) determined at 432 to thereby increase the accuracy of spatial orientation determination accuracy. Any suitable technique may be used to compare reference source and selection device orientation data, such as matching source and selection device orientation data via a lookup table, which may be determined by logic subsystem 214 and stored in memory subsystem 216, for example. It will be further appreciated that at this or another step of method 423, a spatial location of a user and/or selection device 202 may be received to thereby improve display device identification and/or selection, for example in embodiments in which display devices are associated with quadrants, angular regions, or other unique regions. Reception of such data may improve display device selection for scenarios in which users position themselves in areas away from the center of an environment.

At 436 of method 423, one or more connectivity identifiers are associated with the selection device orientation determined at 432 for the selected display device. In some embodiments, one or more connectivity identifiers are determined at 426. In such a case, the determined connectivity identifier(s) may be easily associated with the selection device orientation for the selected display device. Other scenarios are possible, for example, such as that described in further detail below with reference to FIG. 4E.

At 438 of method 423, it is evaluated whether or not orientation data for all display devices identified at 426 has been determined. Such evaluation may be carried out by configuration application 500, for example, which may notify a user if orientation for all identified displays has not been determined. If orientation data for all display devices identified at 426 has not been determined, method 423 may return to 428 to obtain orientation data for all identified display devices. As shown in FIG. 5A, window 504 also includes a termination button 510 which may be engaged by a user to terminate configuration before orientation data is determined for all identified displays, though such termination may limit the number of display devices which may be controlled in their environment.

It will be appreciated that the steps heretofore described may correspond to the configuration phase described above in which selection device 202 is trained to identify and select display devices in its environment, while those following and illustrated in FIG. 4E may correspond to a use phase in which display device selection may be carried out by controlling the orientation and activation of the selection device. In some embodiments, the configuration phase may be performed on selection device 202 or a separate device (e.g., configuration device 120 in FIG. 1A) prior to use of an environment and its display devices by one or more users. Here, data recorded during the configuration phase (e.g., spatial orientations and connectivity identifiers) may be saved for later use if the same device is used to select display devices, or the data may be saved for subsequent downloading by another device. The latter example may correspond to a scenario in which an information technology professional has configured an environment for use. Following such configuration, users may arrive with their own selection devices and use such devices to download the configuration information, for example configuration data stored in a configuration database, such that they may immediately control the spatial orientation and activation of their selection devices to drive display device selection and output, bypassing the configuration phase. In FIG. 1A, for example, configuration device 120 may be used to carry out the configuration phase and store associated configuration data for later download by one or more selection devices.

Turning now to FIG. 4E, a method 451 is shown for selecting display devices for multimedia content output. Method 451 may be stored on memory subsystem 216 and executed by logic subsystem 214 of selection device 202. It will be appreciated, however, that method 451 may be carried out by other suitable devices.

At 452, an image of a display device may optionally be captured upon activation, for example by camera 212. As described above with reference to FIG. 1A, an image may be captured of a display device itself (e.g., display device 104), a secondary display device (e.g., secondary display device 123) adjacent the first display device, a set of lights (e.g., set of lights 124) on a bezel of the display device, or an identifying mark (e.g., identifying mark 126) which may also be on the bezel of the display device. At 454, an audio signal emitted by the display device may optionally be received in embodiments in which one or more display devices are capable of outputting audio—e.g., display device 104 which includes integrated speaker 128.

At 455, following completion of the configuration phase, a display device output selection may be received via a control application or via activation of selection device 202. Turning now to FIG. 5B, an exemplary control application 550 having a GUI 552 is shown. Control application 550 may be executed on selection device 202 in embodiments in which the selection device includes a display screen, or the application may be executed on source device 118 in embodiments in which the source device stores multimedia content to be shared, for example. As in configuration application 500, GUI 552 displays region 506 which lists the identified display devices, their associated names, and their associated connectivity identifiers. A window 554 indicates the multimedia content being outputted and to which display device it is being outputted. In this example, the desktop of an operating system executing control application 550 is being shared to Interactive Whiteboard 2. Window 554 further lists one or more running applications in an application region 556 whose output may be shared to the identified display devices. A preview region 558 provides a representation of the output being sent to Interactive Whiteboard 2. Finally, control application 550 includes an output termination button which may be engaged to terminate output to Interactive Whiteboard 2. It will be appreciated that control application 550 is shown for illustrative purposes, and that in some embodiments, the control application may be combined with configuration application 500 described above. The state and appearance of the combined application may change depending on a transition from the configuration phase to the use phase.

Control application 550 also illustrates one of a plurality of methods which may be used to select display devices for multimedia content output. In some embodiments, selection of a desired display device and output of multimedia content thereto may be carried out by engaging a button corresponding to the desired display device (e.g., pressing the button on a touch screen). Additionally or alternatively, the orientation of a selection device executing control application 550 (e.g., selection device 202) may be controlled to point toward a desired display device and the selection device may be activated to route multimedia content to the desired display device, as described above. In this example, a selecting spatial orientation may be recorded, also as described above. It will be appreciated that reference source orientation data received at 434 of method 423 may be compared to a recorded selecting spatial orientation alternatively or in addition to a recorded identifying spatial orientation. In this way, an accuracy of the selecting spatial orientation and/or identifying spatial orientation, respective to the desired display, may be increased.

At 456, the spatial orientation of selection device 202 is determined with compass 218 and gyroscope 220. It will be appreciated, however, that other methods and components may be used to determine the spatial orientation of the selection device, as described above. At 458, a display device desired to receive multimedia content output is determined based on the spatial orientation determined at 456. As described above, determination of the desired display device may include matching the selection device spatial orientation at the time of activation (e.g., selecting spatial orientation) to a previously-recorded spatial orientation (e.g., identifying spatial orientation), and may include consideration of tolerance, angular or other regions, and reference source(s).

At 460, one or more connectivity identifiers associated with the display device may be determined. Such connectivity identifier(s) may be determined at 426 of method 423, for example. Alternatively or additionally, the connectivity identifier(s) may be determined based on information optionally gathered at 452 and/or 454. In the latter example, the secondary display, set of lights, identifying mark, and emitted audio signal may each encode therein one or more connectivity identifiers associated with the display device, as described above. Determining such connectivity identifiers at 460 may thus include decoding such sources of light and audio. As shown in FIG. 1A, display device 104 may output a QR code 130 encoding therein an associated IP address. At 462, multimedia content output to the display device may then be driven according to the associated connectivity identifiers. In this way, a method may be provided in which connectivity identifiers for display devices are encoded in an environment and which may be detected by a camera and/or microphone, for example. Such an approach may obviate the need for a configuration phase, allowing rapid and intuitive control of display device output.

Method 451 shows two possibilities by which multimedia content may be routed to the display device. At 464, multimedia content may be routed to the display device via the one or more connectivity identifiers determined at 460. Such an approach may refer to embodiments in which the selection device executing method 451 (e.g., selection device 202) is connected to the network to which the display device is also connected, and to embodiments in which the selection and source device are integrated into a single device. Thus multimedia content originating on the selection device may be directly routed to the display device after determination of the associated one or more connectivity identifiers. In other embodiments, method 451 may proceed to 466 where the selection device emits an audio signal (e.g., via speaker 210) including therein spatial orientation data of the selection device and/or one or more connectivity identifiers associated with the display device. In this example, the selection device may be used to select display devices and obtain their associated connectivity identifiers. Selection of a display device upon activation may then be communicated to a separate device which may store multimedia content to be shared (e.g., source device 118 in FIG. 1A). Window 554 of FIG. 5B illustrates a message reading "transmitting selecting audio signal" in embodiments in which a selection is conveyed via audio transmission.

Turning now to FIG. 7, an exemplary pointing device or pointer 700 is shown for use as a selection device. Pointer 700 may facilitate and communicate display device identification and/or selection and communicate to a separate device storing multimedia content to be shared. Pointer 700 may have a substantially cylindrical body suited to a typical user's grip and a conical head having a truncated, flat tip. Further, pointer 700 may house one or more of the elements of selection device 202 in some embodiments.

Proceeding left-to-right in the figure, pointer 700 may include a camera 702, a microphone 704, a speaker 706, a button 708, a communication port 710, and a hatch 712. The camera, microphone, and speaker may be configured to carry out the functionality described above with respect to their counterparts in selection device 202. Button 708 may be a physical button which may be pressed by a user to activate pointer 700, causing emission of information regarding display device identification and/or selection from speaker 706. Communication port 710 may be a physical interface configured to send and receive information during a configuration phase. In some embodiments, communication port 710 is a USB port by which pointer 700 may be connected to another device to receive configuration information, as described in further detail below with reference to FIG. 8. Hatch 712 may be a detachable, releasable, or include other accessible mechanisms by which an internal power source (not shown) may be accessed. The power source may correspond to power source 204 of selection device 202, and may be a replaceable and/or rechargeable nickel-cadmium or lithium-ion battery, for example. Pointer 700 may further internally include a logic subsystem 714 and a memory subsystem 716, which may correspond to logic subsystem 214 and memory subsystem 716 of selection device 202, respectively. Logic subsystem 714 may be configured to execute instructions stored on memory subsystem 716 to thereby facilitate display device identification and/or selection. Still further, pointer 700 may include a compass 718 and a gyroscope 720 configured to determine the spatial orientation and/or pointing direction of the pointer. Compass 718 and gyroscope 720 may correspond to compass 218 and gyroscope 220 of selection device 202, respectively.

Turning now to FIG. 8, a method 800 is shown illustrating a method by which a pointer (e.g., pointer 700) may be configured using a configuration device, which may be, for example, source device 118 or configuration device 120. At 802, a configuration application (e.g., configuration application 500) may be executed on the configuration device. At 804, one or more display devices on a network to which the configuration device is connected may be identified. At 806, a connection may be established between the configuration device and pointer 700, for example by connecting pointer 700 via communication port 710 to a suitable communication port in the configuration device. At 808, a display device identification selection may be received via the configuration application. Such selection may be user input indicating a display device which the user desires to identify. Accordingly, at 810, a display identifier may optionally be routed to the identified display device. The display identifier may provide a visual indication of the display device undergoing identification, as described above with reference to FIG. 6. At 812, orientation data corresponding to the identified display device may be received from pointer 700. The orientation data may be recorded upon activation of pointer 700 (e.g., via pressing button 708) via one or more orientation-determining devices (e.g., a gyroscope, compass, etc.). At 814, the recorded orientation data may be compared to reference source orientation data in embodiments in which reference source orientation data is recorded from a reference source (e.g., reference source 122 in FIG. 1A). The comparison may improve the accuracy of orientation data (e.g., identifying and/or selecting spatial orientation) associated with the display device. At 816, the resulting orientation data, along with one or more connectivity identifiers associated with the display device, may be encoded by the configuration device. The connectivity identifier(s) may be collected, for example, by the configuration device at 804. The orientation data and one or more connectivity identifiers may be encoded in any suitable format using any suitable technique. In some embodiments, such information may be encoded in an alphanumeric text string storing spatial orientations and/or connectivity identifiers in an array data structure. In some environments in which a plurality of display devices are identified with each having an associated spatial orientation and one or more connectivity identifiers, the resulting text string may not exceed 100 bytes, which may reduce computational overhead, increase the speed of display device identification and selection, and decrease the silicon footprint of pointer 700.

At 818, the encoded orientation data and one or more connectivity identifiers may be transferred to pointer 700 via communication port 710 for storage on memory subsystem 716. If, as in some embodiments, such data is encoded in one or more alphanumeric text strings, a transfer rate on the order of 9600 bauds may be sufficient, for example, which may reduce computational overhead and power consumption. Further, the transfer performed at 818 may be on the order of several seconds, for example. Finally, at 820, it is determined whether or not orientation data for all display devices identified at 804 have been transferred to pointer 700. If it is determined that orientation data for all display devices identified at 804 have not been transferred to pointer 700 (NO), method 800 may return to 808 to complete identification of all display devices in the corresponding environment.

The steps heretofore described may correspond to a configuration phase in which pointer 700 is trained to identify and select one or more display devices in an environment using a separate configuration device. FIG. 9 shows a method 900 which may be implemented on a device (e.g., source device 118 or configuration device 120) to drive display device selection. Method 900 may correspond to a use phase, for example the selection phase, following the configuration phase.

At 902, an audio signal emitted by speaker 706 of pointer 700 may be received by the source device and an associated microphone. The audio signal may be encoded by default, as the audio signal may directly represent encoded information (e.g., an encoded alphanumeric text string) stored on memory subsystem 716. Alternatively, logic subsystem 714 may encode display device selection information prior to its emission via speaker 706. The audio signal may include a spatial orientation and one or more connectivity identifiers associated with a display device. At 904, the received audio signal may be decoded at the source device to thereby identify the display device selected by pointer 700. At 906, a connection may be established with the display device identified in the decoded audio signal. Finally, at 908, multimedia content may be routed to the display device identified in the decoded audio signal via one or more decoded connectivity identifiers. Multimedia content may reside on source device 118, for example, such that the multimedia content may be directly routed to the display device, or in other embodiments, the multimedia content may reside on a separate device connected to the network device 116. As a non-limiting example, an IP address associated with a display device may be determined from the audio signal and used to route multimedia content to the display device. It will be appreciated, however, that the above described steps may apply to scenarios in which a selection device is separate but operatively coupled to a source device holding multimedia content thereon—for example, as shown in FIG. 1A, selection device 114 may be separate but communicative with source device 118. In other embodiments in which the source and selection device are integral (e.g., provided in the same device housing), steps 902 and 904 may be omitted.

As an illustrative example, a method may be executed by a selection device having a camera (e.g., pointer 700 having camera 702) to select display devices. In this approach, a configuration phase may be omitted as describe above. An image of a display device may be captured by the camera (e.g., camera 702) upon activation of the selection device. As described above, an image of a secondary display, set of lights, or identifying mark may be captured which each may encode one or more connectivity identifiers associated with the display device. An identifying audio signal emitted by the display device may then be received (e.g., from display speaker 128 of display device 104), which may also encode therein one or more connectivity identifiers associated with the display device. Finally, the selection device may emit an encoded audio signal including one or more connectivity identifiers determined from the above sources. The encoded audio signal may then be received by a separate device having multimedia content stored thereon (e.g., source device 118 in FIG. 1A) or by another device configuration device (e.g., configuration device 120) which may then route multimedia content to the selected display. Pointer 700 may emit an encoded audio signal from speaker 706, for example. In this way, pointer 700 may be used to immediately select display devices for multimedia content while bypassing a configuration phase. Such an approach may allow users to bring source devices having multimedia content stored thereon to an environment and control the spatial orientation and activation of pointer 700 to thereby route the multimedia content to a desired display device.

Turning now to FIGS. 10A and 10B, a method 1000 for routing multimedia content to a desired display device according to an embodiment of the present disclosure is shown. Method 1000 may be implemented in multimedia environment 300 of FIG. 3C, for example. At 1002, method 1000 may optionally include receiving a reference source spatial orientation with a selection device. As discussed above, the reference source spatial orientation may be a spatial orientation of a fixed point within the multimedia environment. At 1004, method 1000 may optionally include receiving a selecting reference source spatial orientation with the selection device. As discussed above, the reference source spatial orientation may be compared to the selecting reference source spatial orientation at 1006 and a position and spatial orientation of the selecting device may be determined at 1008. The optional steps 1002, 1004, 1006, and 1008 of method 1000 may provide increased accuracy of identifying spatial orientations and selecting spatial orientations received at step 1010 and step 1022, respectively.

At 1010, method 1000 may include receiving a respective identifying spatial orientation of each of the one or more display devices with the selection device. At 1012, method 1000 may include associating the spatial orientation and one or more connectivity identifiers with each of one or more display devices in an environment (e.g., multimedia environment 300). Put another way, a spatial orientation which is used to identify a display device (e.g., during the configuration phase in conjunction with execution of configuration application 500), and which is respective to one of one or more display devices, is associated with that one display device. In this way, an identifying spatial orientation and one or more connectivity identifiers are respectively associated with each of the one or more display devices in the environment. As described above, the identifying spatial orientations may be determined by one or more orientation-determining components (e.g., compass 218 and/or gyroscope 220 of selection device 202) and/or the position and spatial orientation of the selecting device within multimedia environment 300, while the one or more connectivity identifiers may be determined by a device (e.g., selection device 114, source device 118, or selection device 202) connected to a network to which the one or more display devices are connected. Such information may be respectively associated with each of the one or more display devices by a device executing configuration application 500—for example selection device 114, configuration device 120, or selection device 202. At 1014, the respective identifying spatial orientation and one or more connectivity identifiers for each of the one or more display devices may be stored locally within memory of the selecting device, configuration device, or device executing the configuration application. In other embodiments, the respective spatial orientation and one or more connectivity identifiers for each of the one or more display devices may be stored remotely, such as at a network connected server and/or cloud based storage, for example.

At steps 1016, 1018, and 1020, method 1000 may optionally include receiving a selecting reference source spatial orientation, comparing the reference source spatial orientation to the selecting source spatial orientation, and determining the position and spatial orientation of the selection device. Repeating these steps prior to receiving a respective selecting spatial orientation of a desired display device provides the advantage of selection of a desired display device from multiple positions within the multimedia environment. As discussed above for FIG. 3C, a change in position of the selection device within multimedia environment 300 may change the spatial orientation of the one or more display devices relative to the selection device. As the stored spatial orientations of each of the one or more display devices are determined relative to the position and spatial orientation of the selection device during the configuration phase, repeating the determination of the position and spatial orientation of the display device may be used to correct the respective spatial orientations of each of the one or more display devices relative to the change in position of the selection device within the multimedia environment.

At 1022, a respective selecting spatial orientation is received. The selecting spatial orientation may be a spatial orientation recorded upon activation of selection device 114 or selection device 202, for example, and may be recorded for the purpose of selecting a display device for multimedia content output. In some embodiments, the respective selecting spatial orientation may be received by the same device used to record the selecting spatial orientation (e.g., selection device 202). In other embodiments, the selecting spatial orientation may be recorded by pointer 700, encoded in an audio signal emitted by the pointer, and received by a separate device (e.g., source device 118). At 1024, the respective selecting spatial orientation is matched to the respective identifying spatial orientation to determine the display device desired for multimedia content output. Such matching may again be performed by the same device or by separate devices used to record one or both of the identifying and selecting spatial orientations. As described above, in some embodiments, matching may include utilizing reference source orientation data and may include spatial orientations to angular regions or quadrants separating individual display devices. At 1026, method 1000 may optionally include retrieving the one or more connectivity identifiers of the desired display device from local or remote storage.

Finally, at 1028, multimedia content is routed to the desired display device via one of the one or more connectivity identifiers associated with the desired display device. The multimedia content may be routed, for example, by the device storing the multimedia content (e.g., source device 118 of FIG. 1A).

Thus, as described above, in one embodiment, a method for routing multimedia content to a desired display device is provided. In one example method, the method includes receiving a respective identifying spatial orientation, associating the respective identifying spatial orientation and one or more connectivity identifiers with each of one or more display devices, receiving a respective selecting spatial orientation, matching the respective selecting spatial orientation to the respective identifying spatial orientation to thereby determine the desired display device from the one or more display devices, and routing multimedia content from a source device to the desired display device via one of the one or more associated connectivity identifiers. The method may further include prior to routing the multi-media content from the source device, encoding the connectivity identifier associated with the desired display device into an encoded signal and sending the encoded signal to the source device. In some examples, the encoded signal may be an audio signal. The source device and one or more display devices may be connected to one or more telecommunications networks for use in sending multi-media content from the source device to the display device. For example, the source device and the display device may both include wireless telecommunications functionality. As a non-limiting example, the source device and display device may both connect to a wireless data network, such as a 3G, 4G, LTE, or any other suitable cellular data network. A second non-limiting example may include the source device and the display device including wireless telephone network connectivity where each of the source device and display device may have a specific identifier or phone number and may communicate via Short Message Service (SMS) messaging or any other suitable messaging protocol. In some embodiments, the respective identifying spatial orientation and one or more connectivity identifiers associated with each of the one or more display devices may be stored in local or remote storage. The stored identifying spatial orientation and one or more connectivity identifiers may be retrieved from storage for a display device with a respective identifying spatial orientation matching the respective selecting spatial orientation.

As another non-limiting example, the method may further include receiving a reference source spatial orientation and comparing the reference source spatial orientation to the respective selecting spatial orientation to determine a position and spatial orientation of the selection device during configuration and prior to receiving the respective selecting spatial orientation thereby increase an accuracy of the respective selecting spatial orientation. The respective selecting spatial orientation may be received from a selection device and the multimedia content may be routed from a source device where the selection device has one or more orientation-determining components. The one or more orientation-determining components may include one or both of a compass and a gyroscope. The selection device may be integrated into the source device.

As described above, a system for routing multimedia content to a desired display device is disclosed. In an example system, an orientation-determining component configured to determine a respective identifying spatial orientation and a respective selecting spatial orientation for each of one or more display devices in an environment is provided. The system may include a logic subsystem and a memory subsystem holding instructions executable by the logic subsystem to associate the respective identifying spatial orientation and one or more connectivity identifiers with each of the one or more display devices, match the respective selecting spatial orientation to the respective identifying spatial orientation to thereby determine the desired display device from the one or more display devices, and encode the connectivity identifier associated with the desired display device into an encoded signal and send the encoded signal to a source device.

The system may further include instructions executable to receive a reference source spatial orientation; and compare the reference source spatial orientation to the respective selecting spatial orientation to thereby increase an accuracy of the respective selecting spatial orientation. The reference source spatial orientation may include a room position of the reference source and a room angulation of the reference source. The orientation-determining components may include one or both of a compass and a gyroscope.

In one example system, the source device may be configured to send multi-media content to the desired display device based on the connectivity identifier received in the encoded signal. The system may further include a camera configured to capture images of one or more of a secondary display device, a set of lights, and an identifying mark. A power source may be configured to supply electrical power to the logic subsystem, memory subsystem, and camera.

Turning now to FIG. 11, a method 1100 for configuring a source device to identify and select one or more display devices for multimedia content output according to an embodiment of the present disclosure is disclosed. Method 1100 may be implemented in environment 100 of FIG. 1A. At 1102, method 1100 includes executing a configuration application on a source device, such as source device 118 of FIG. 1A, for example. Upon execution of the configuration application, source device 118 may enable an integrated microphone to listen for an audio signal emitted by one of display devices 102, 104, 106, 108, 109, and 110 present in environment 100. For example, User 112 may cause display device 104 to emit an audio signal. The audio signal may encode a display device identifier, a connectivity identifier, spatial orientation information, one or more connection protocols, etc.

At 1104, method 1100 includes receiving the audio signal emitted from the display device. The source device may receive a display device and connectivity identifier at 1106. The source device may receive the display device and connectivity identifier through processing the audio signal.

At 1108, method 1100 includes determining one or more connectivity identifiers associated with the display device. The one or more connectivity identifiers may include any of a network identifier such as an IP address, an identifier for direct connection such as a Bluetooth, Miracast, or any other direct connection protocol, or any identifier employed by a suitable connectivity method.

At 1110, method 1100 includes driving multimedia content output to the display device, such as a test pattern, audio signal, or other multimedia content, through one of the one or more connectivity identifiers. Optionally and additionally, at 1112, method 1100 may include the source device routing multimedia content to the display device via one or more determined connectivity identifiers. The method may then end.

Thus, a system and method for configuring a multimedia environment is provided as discussed above. The system and method may be used for a single display device or multiple display devices. The display devices may be in a room and have a spatial orientation associated with the display device. The display devices may be configured with a configuration device and then selected for use with a selection device. The configuration device may be used to populate a configuration database with configuration data. The selection device may be used to access the configuration database and relate a selection spatial orientation of a desired display device to the stored configuration data in the configuration database to select the desired display device. The selection device may then confirm the desired display device and drive multimedia source content from a source device, which may be integrated or a standalone system, to the desired display device. Additionally, multiple display devices, if present, may be selected.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various configurations, and other features, functions, and/or properties disclosed herein.

The following claims particularly point out certain combinations and subcombinations regarded as novel and nonobvious. These claims may refer to "an" element or "a first" element or the equivalent thereof. Such claims will be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal or different in scope to the original claims, also are regarded as included within the subject matter of the present disclosure.

The invention claimed is:

1. A method for configuring a multimedia environment, comprising:
   at a configuration device in electronic communication with a first display device and a second display device over a network connection and including an orientation determining component, memory, and a processor, receiving from the first display device and the second display device display device information, the display device information comprising a display device identifier and a network connectivity;
   identifying a spatial orientation associated with each of the first display device and the second display device using the orientation determining component and based on a common reference point;
   associating the identified spatial orientations with the received display device information for the first display device and the second display device;
   storing the associated spatial orientations and the display device information for the first display device and the second display device as configuration data in a configuration database;
   receiving a spatial orientation of a selection device relative to the common reference point, where the common reference point is a same predetermined angle for the first display device, the second display device, and the selection device, the common reference point being a cardinal direction; and
   displaying multimedia content on at least one of the first display device and the second display device based on the configuration data and the spatial orientation of the selection device relative to the common reference point.

2. The method of claim 1, further comprising:
   accessing the configuration database from the selection device;
   determining a selecting spatial orientation at the selection device; and
   associating the selecting spatial orientation with one of the associated spatial orientations in the configuration database to determine a desired display device.

3. The method of claim 2, further comprising:
   connecting the selection device to a source device, the source device comprising the multimedia content; and
   driving the multimedia content from the source device via the selection device to the desired display device.

4. The method of claim 3, further comprising, prior to driving the multimedia content from the source device, encoding the display device identifier associated with the desired display device into an encoded signal and sending the encoded signal to the source device.

5. The method of claim 4, where the encoded signal is an audio signal.

6. The method of claim 1, wherein a pointing direction of the selection device is determined by a compass in the configuration device and/or the selection device, the pointing direction used to determine the spatial orientation of the selection device relative to the common reference point.

7. The method of claim 6, wherein the pointing direction is further determined by a gyroscope of the selection device, the gyroscope used to determine an up or down direction of the selection device.

8. The method of claim 3, wherein the source device is an external source device and is operatively coupled to the selection device.

9. A system for configuring a multimedia environment, comprising:
   a first display device and a second display device within the multimedia environment, wherein the first display device and the second display device include display device information comprising a display device identifier and a network connectivity;
   a configuration device within the multimedia environment, the configuration device coupled to the first display device and the second display device over a network, the configuration device programmed to:
      receive, from each of the first display device and the second display device, the display device information;
      identify a room spacing alignment corresponding to each of the first display device and the second display device relative to a same common reference point, the same common reference point being a predetermined angle;
      associate the identified room spacing alignment with the received display device information for each of the first display device and the second display device; and
      store the associated identified room spacing alignment and received display device information for the first display device and the second display device as configuration data in a configuration database;
   wherein at least one of the first display device and the second display device displays multimedia content based on the configuration data and a spatial orientation of a selection device relative to the same common reference point.

10. The system of claim 9, wherein the selection device is an integral selection device integrated with the configuration device, the selection device programmed to:
   access the configuration database;
   determine a selecting spatial orientation; and
   associate the selecting spatial orientation with one of the room spacing alignments in the configuration database to determine a desired display device.

11. The system of claim 9, further comprising a server coupled to the configuration device.

12. The system of claim 11, wherein the configuration data in the configuration database is stored on the server.

13. The system of claim 10, wherein the selection device is programmed to access the configuration database and select the desired display device.

14. The system of claim 13, wherein the selection device selects the desired display device by providing the spatial orientation from the selection device and selecting the desired display device by matching the provided spatial orientation to the room spacing alignment stored in the configuration database.

15. The system of claim 13, further comprising a source device coupled to the selection device, the selection device further programmed to drive source multimedia content from the source device to the desired display device.

16. The system of claim 9, wherein the configuration device is further programmed to:
receive, from a reference source, reference data comprising a room position and the common reference point; and
store the reference data in the configuration database.

17. A configuration device, comprising:
an orientation determining component determining a room spacing alignment for a first display device and a second display device in an environment;
an audio emission component emitting audio signals;
a logic subsystem;
a memory subsystem holding instructions executable by the logic subsystem to:
receive from the first display device and the second display device display device information in the form of an audio signal;
identify a room spacing alignment for each of the first display device and the second display device relative to a same common reference point, the same common reference point being a cardinal direction;
associate the identified room spacing alignment with the received display device information for the first display device and the second display device; and
store the associated identified room spacing alignment and received display device information for the first display device and the second display device as configuration data in a configuration database.

18. The configuration device of claim 17, wherein a selection device is an integral selection device integrated with the configuration device, the selection device programmed to:
access the configuration database;
determine a selecting spatial orientation; and
associate the selecting spatial orientation with the room spacing alignment in the configuration database to determine a desired display device.

19. The configuration device of claim 17, wherein the orientation determining component is a compass.

20. The configuration device of claim 17, wherein the configuration device is further programmed to:
receive, from a reference source, a room position; and
store the room position with the configuration data in the configuration database.

* * * * *